United States Patent [19]
Takemoto

[11] Patent Number: 5,715,099
[45] Date of Patent: Feb. 3, 1998

[54] MOUNTING METHOD AND STRUCTURE FOR A SOLID-STATE IMAGE PICKUP ELEMENT IN AN IMAGE READING-OUT APPARATUS

[75] Inventor: Hiroshi Takemoto, Machida, Japan

[73] Assignee: Ricoh Company, Ltd., Tokyo, Japan

[21] Appl. No.: 430,506

[22] Filed: Apr. 28, 1995

[30] Foreign Application Priority Data

| Apr. 28, 1994 | [JP] | Japan | 6-091733 |
| Apr. 28, 1994 | [JP] | Japan | 6-091734 |
| Sep. 14, 1994 | [JP] | Japan | 6-219797 |

[51] Int. Cl.$^6$ .................................................. G02B 7/02
[52] U.S. Cl. ...................... 359/819; 359/811; 359/822; 385/136; 347/258; 156/293
[58] Field of Search .................... 359/822, 819, 359/811, 812, 808, 809; 385/136, 33; 347/258; 156/293

[56] References Cited

U.S. PATENT DOCUMENTS

| 4,496,416 | 1/1985 | Mächler et al. | 156/293 |
| 5,267,088 | 11/1993 | Nomura | 359/811 |
| 5,274,732 | 12/1993 | Farnand et al. | 385/136 |
| 5,412,509 | 5/1995 | Nakata et al. | 359/811 |
| 5,465,126 | 11/1995 | Fukuda | 359/811 |
| 5,508,851 | 4/1996 | Tachizawa | 359/822 |

FOREIGN PATENT DOCUMENTS

| 61-118707 | 6/1986 | Japan . |
| 62-139466 | 6/1987 | Japan . |
| 62-268263 | 11/1987 | Japan . |

*Primary Examiner*—Loha Ben
*Attorney, Agent, or Firm*—Oblon, Spivak, McClelland, Maier & Neustadt, P.C.

[57] ABSTRACT

A mounting method and a mounting structure for the solid-state image pickup element in the image reading-out apparatus aiming at assembling the element with high precision and eliminating positional deviation occurring thereafter. The mounting structure comprises a solid-state image pickup element fixing member having a focusing lens fixed thereon, a basic board having the element mounted thereon, and a solid-state image pickup element supporting member from which the basic board can be detached. Between the fixing member and the supporting member are provided connecting portions, and the supporting member is bonded to the fixing member by filling the gap between the connecting portions with the adhesive agent. The connecting portions are constructed with the projection part provided on the fixing member and the hole part provided on the supporting member or vice versa.

45 Claims, 16 Drawing Sheets

MOUNTING METHOD AND STRUCTURE FOR A SOLID-STATE IMAGE PICKUP ELEMENT IN AN IMAGE READING-OUT APPARATUS

BACKGROUND OF THE INVENTION

1. Field of the Invention

The present invention relates to a solid-state image pickup element, in particular, a mounting method and structure for the solid-state image pickup element in the image reading-out apparatus for reading out an optical image by use of the above-mentioned solid-state image pickup element, wherein the above element is employed as the image reading-out portion in the facsimile device, copying machine, scanner, etc.

The invention further relates to a supporting structure for supporting an adjusted member such as the solid-state image pickup apparatus, etc.

2. Description of the Prior Arts

In a conventional optical image reading-out apparatus by use of the solid-state image pickup element, as shown in FIG. 19, an object 3 is focused on a solid-state image pickup element, through an image focusing lens 2 and the same is read out therefrom.

Furthermore, the solid-state image pickup element employs a one-line solid-state image pickup element 4 having plural miniature optoelectric conversion elements arranged in a row (hereinafter, called solely "pixel") usually consisting of a dimension of several μm×several μm.

In such an image reading-out apparatus, the line image focused by an image focusing lens 2 is situated on a solid-state image pickup element 1. And further, in order to read out the optical property (focus, magnification, etc.) with the predetermined precision required, it is necessary to perform positional adjustment by finely moving the image focusing lens 2 and the pixel line 4 of the one-line solid-state image pickup element 1 in the five directions of x, y, z, β, and γ as shown in FIG. 20. The reference numeral 26 represents an optical axis, in FIG. 20.

Furthermore, in recent years, in order to read out the color image, a solid-state image pickup element 1a having three-line elements 4a, 4b, and 4c respectively arranged on three lines per respective pixels; Red (called "R", later), Green (called "G", later), Blue (called "B", later) respectively having the peaks of the light separation into its spectral components sensitivity at R, G, and B is employed on some occasions.

On this occasion, since a margin for the position of the three-line solid-state image pickup element 1a occurs also in the direction α shown in FIG. 20 in addition to the adjustment in the above-mentioned five directions, it is necessary to perform the adjustment in six directions in total (a first axial direction along the optical axis 26, second and third axial directions which are perpendicular to the first axial direction; and first, second and third rotational directions respectively around the first, second and third axial directions).

Usually, the high precision (± several μm) of the positional adjustment of such solid-state image pickup element 1a is required on this occasion. In particular, the indispensable one for attaining the above-mentioned requirement is the technology of preventing the position of the solid-state image pickup element 1a from deviating from the predetermined position at the time of fixing the element after adjusting the position thereof as mentioned above.

Even though the position is adjusted with high precision, when the position deviates at the time of fixing it turns out to be necessary to adjust the position once again. Or otherwise, in the case of adopting the fixing method capable of separating, there is no way except for abolishing the separated portion, and thereby there arises a cause of taking longer time for adjusting the position or raising the manufacturing cost. In such a situation, the technology as mentioned above is required.

As to such fixing, although the fixing method by screw has been frequently adopted conventionally, the other fixing method by adhesive agent has been tried in recent years on many occasions, because the amount of the positional deviation is too large (several hundreds μm or several tens μm) and on the other hand the positional deviation caused by the latter method is smaller than that caused by the former method.

As to the fixing method by use of the adhesive agent, the method is roughly classified into two. The first one is the method of bringing both portions to be bonded into direct contact with each other. The second one is the method of providing a gap therebetween. The former method is called "Direct Contact Adhering", while the latter is called "Filling-up Adhering".

In recent years, there are proposed various sorts of solid-state image pickup element fixing methods. As one example of them, the specification of Japanese Laid-open Patent Publication No. 62-139466/1987 describes that a complicated mechanism is disposed at the side of the image reading-out apparatus such that the portions to be bonded are always brought into direct contact with each other even though the position of the solid-state image pickup element is adjusted.

In such a method as described in the specification, the positional adjustment itself of the solid-state image pickup element not only turns out to be complicated, but it is necessary to provide position adjusting mechanism not required for attaining the essential function of reading out the image in the image reading-out apparatus. Consequently, the considerable cost of the parts not required for attaining the essential function is added inevitably, and thereby it follows that the cost of manufacturing is raised largely.

Furthermore, since there exist a large number of movable parts in the adjustment mechanism, many portions to be bonded have to be provided necessarily, and further positional deviation due to bonding occurs on many occasions. Those above-mentioned matters are the deflects of the conventional structures (prior arts).

Furthermore, in the case of adopting the method proposed in Japanese Laid-open Patent Publication No. 62-268263, although the directly contacting portion for fixing the solid-state image pickup element by use of an adhesive agent is not formed with a complicated mechanism and thereby the cost is not raised, the solid-state image pickup element is brought into direct contact with a part of the image reading out apparatus and adhered thereon, and there is no problem if the directly-contacting parts of the above both portions are located on the predetermined position, and on the contrary, if the directly-contacting parts thereof deviate from the predetermined position it is impossible to determine the solid-state image pickup element's position only by bringing both into direct contact. Consequently, a washer is interposed therebetween for adjustment of positioning and thereafter both are bonded to each other.

However, in such a method, it is difficult to perform the positional adjustment of several-μm level rapidly and with high precision. Furthermore, it is necessary to prepare the washer per each adjustment and thereby it turns out to be difficult to cope with the problems for the mass-production thereof.

Furthermore, the point at issue (problem to be solved) commonly proposed in the above-mentioned two Japanese Laid-open Patent Applications is that since both portions to be bonded are brought into direct contact with each other and nevertheless both are not brought into completely tight contact with each other and thereby there exists therebetween a gap of several hundred μm or less, the adhesive agent infiltrates into (fills) the interior of the member to be fixed by the action of the capillary phenomenon on some occasions in relation to the factors; the surface tension and density both inherent in the adhesive agent or the aforementioned gap.

For this reason, according to the filling state thereof, it causes a positional deviation of the member to be fixed at the time of hardening the adhesive agent. Furthermore, in the case of employing an optically-hardening type adhesive agent, the light rays cannot be radiated into the interior of the member to be fixed, and thereby not-hardened portions remain in the adhesive agent. In such a situation, even though the members to be fixed are put on the predetermined position, the hardening of the adhesive agent advances later due to the thermal variation, etc., and thereby the positional deviation occurs. The above is the deflect of the related (prior) art.

On the other hand, there are proposed various sorts of the fixing method of the solid-state image pickup element utilizing the filling adhesion. One of them is described in Japanese Laid-open Patent Publication No. 61-118707/1986 proposing the fixing method. In this method, there is provided a complicated mechanism enabling the positional adjustment of the solid-state image pickup element having a fixing-side member and a directly-contacting portion. In such construction, the directly-contacting portions are not brought into direct contact with each other. Instead, the adhesive agent fills the portions having the gap not coming into direct contact with each other.

In such a method as mentioned above, it is not profitable that cost up may be caused as in the aforementioned case of Japanese Laid-open Patent Publication No. 62-139466/1987. Furthermore, there exist another direct-contact portions of the solid-state image pickup element and the fixed-side member in addition to the portions to be bonded. In particular, since screw and resilient body are employed as the direct-contact member, the screw is loosened due to vibration and/or temperature (thermal) variation, or the resilient body exerts an eternal force on the solid-state image pickup element by the action of vibration or plastic deformation. Those matters cause the positional deviation of the solid-state image pickup element on some occasions.

Usually, in the method of "Filling Adhesion", in case that the adhesive strength and the positional deviation due to adhesion are respectively required to be set to the desired values without any unevenness, it is necessary to uniformly fill the portions to be bonded with the adhesive agent so as to form optional shape, and it is further necessary to set the amount of the adhesive agent as small as possible.

In this method, in order to uniformly fill the portions to be bonded with the adhesive agent, it is preferable to employ the adhesive agent having low viscosity. However, as shown in FIG. 22, if a gap E between mounting plate 38 and solid state image pickup element 1 is not small, the adhesive agent 24 flows out from the gap E in the case of employing the adhesive agent of low viscosity.

On the other hand, even though the gap E is made small, the adhesive agent 24 flows out from the gap portion by the action of the capillary phenomenon on some occasions. In the case of employing an optically-hardening type adhesive agent, the light rays are not radiated on the gap portion and thereby the not-hardened portion remains. Even though the portions to be bonded are located on the predetermined positions at the time of adjusting and fixing, the hardening of the adhesive agent proceeds later due to the temperature (thermal) variation. Probably, it follows that the position of the solid-state image pickup element deviates from the predetermined.

Furthermore, in this method, there exists a problem to be solved that the required amount of the adhesive agent is too much, from the viewpoint of the dimension (square measure) of the adhesive agent coming into contact with the object to be bonded. Consequently, there occurs a troublesome matter that, for the above reasons, the position of the solid-state image pickup element deviates from the predetermined and the cost regarding the adhesive agent is raised. Those are the trouble (demerit) of the conventional (prior) art.

And further, on the other hand, according to the fixing method of the solid-state image pickup element proposed in a magazine; Nikkei Mechanical (published on Jun. 29, 1992-Page 88), there exists no adjustment mechanism for adjusting the position of the solid-state image pickup element.

Consequently, it does not cause any cost-up as mentioned in Japanese Laid-open Patent Publication No. 62-139466/1987, and further, since the object to be bonded is constructed with a cylindrical hole and a cylindrical pin, it does not require a large amount of the adhesion agent, and nevertheless sufficient adhering dimension (square measure) can be secured. It follows that the adhesive strength is improved and the amount of the positional deviation is reduced.

However, even in this method, there arises a problem that the adhesive agent overflows downward if the gap between the cylindrical hole and the cylindrical pin is not small. On the contrary, if the gap is made too small, there arises another problem that it is difficult to put the adhesive agent throughout into the gap. Furthermore, in the case of employing the optically-hardening type adhesive agent, the light rays cannot easily infiltrate into the bottom portion of the gap. Consequently, it needs a long time to completely harden the adhesive agent or not-hardened portion remains. It follows that there arises a problem that the positional deviation of the solid-state image pickup element occurs as in the other method as mentioned above.

In such a situation, the present applicant (inventor) proposes the following structure in connection with the mounting method and the mounting structure of the solid-state image pickup element in the image reading-out apparatus. The patent application describing the above-mentioned method and structure has been filed at the same time as that of the above patent application.

Namely, a mounting structure of a solid-state image pickup element in an image reading-out apparatus proposed by the inventor comprises a solid-state image pickup element, an image focusing lens for focusing image, a fixing member for fixing the solid-state image pickup element which further fixes the image focusing lens, a basic board having the solid-state image pickup element mounted thereon, and a support member for supporting the solid-state image pickup element on which the basic board is mounted so as to be detachable therefrom, wherein connecting portions are provided between the solid-state image pickup element fixing member and the solid-state image pickup element supporting member, wherein the connecting portions are bonded to the solid-state image pickup element fixing member after adjusting the position of the solid-state image pickup element supporting member, wherein the connecting portions are constructed with a projection/hole portion provided on image pickup element and a hole/projection portion provided on the support member for supporting the solid-state image pickup element, wherein a gap portion between a projection part and a hole part of the projection/hole portion and the hole/projection portion is formed such that the injection side for injecting adhesive agent or the tip end side of the projection part turns out to be wide, and wherein said connecting portions are bonded to each other by dispensing (painting or applying) the adhesive agent on the gap portion after performing the positional adjustment by use of a jig.

Furthermore, the present applicant (inventor) has proposed the mounting method and the mounting structure of the solid-state image pickup element in the image reading-out apparatus described in Japanese Patent Application 6-91733/1994, in which the solid-state image pickup element can be assembled with high accuracy and further the positional deviation seldom occurs thereafter.

SUMMARY OF THE INVENTION

On such occasion as mentioned heretofore, assuming that the rigidity of the solid-state image pickup element supporting member is equal to or lower than that of the basic board having the solid-state image pickup element mounted thereon, the solid-state image pickup element supporting member is distorted and even the basic board is also distorted at the time of performing the positional adjustment by holding the solid-state image pickup element fixing member and the solid-state image pickup element supporting member by use of the jig. After adhering the connecting portions, when the bonded object is detached from the jig, the distortion of the solid-state image pickup element supporting portion returns to its initial state, and thereby there is a fear that the positional relationship between the solid-state image pickup element fixing member and the solid-state image pickup element supporting member is shifted from the predetermined.

And further, after assembling such mounting structure of the solid-state image pickup element, etc. in the image reading-out apparatus, when the external force is exerted on the solid-state image pickup element supporting member, there is also another fear that the solid-state image pickup element supporting member is also distorted and thereby similar troublesome demerit arises.

If such positional relationship is shifted, the positional relationship between the solid-state image pickup element mounted on the basic board and the focusing lens mounted on the solid-state image pickup element fixing member is also shifted and thereby the image quality is lowered (deteriorated).

Furthermore, if the position of mounting the supplementary (auxiliary) member on the basic board is not considered even in the above-mentioned mounting structure of the solid-state image pickup element in the image reading-out apparatus proposed by the present applicant (inventor), a curvature (arch) occurs by the action of the heat or the like on the basic board in the direction perpendicular to the light rays for the solid-state image pickup element, and thereby there arises a fear of causing the positional deviation of the solid-state image pickup element.

in consideration of such a situation as mentioned heretofore, the objects of the present invention are as mentioned below.

It is a primary object of the present invention to solve all of the problems mentioned heretofore.

It is another object of the present invention to provide a mounting method and a mounting structure of the solid-state image pickup element in the image reading-out apparatus for enabling to assemble the solid-state image pickup element with high accuracy.

It is still another object of the present invention to provide a mounting method and a mounting structure of the solid-state image pickup element in the image reading-out apparatus for reducing or eliminating the occurrence of the positional shift (deviation) of the element after assembling that.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
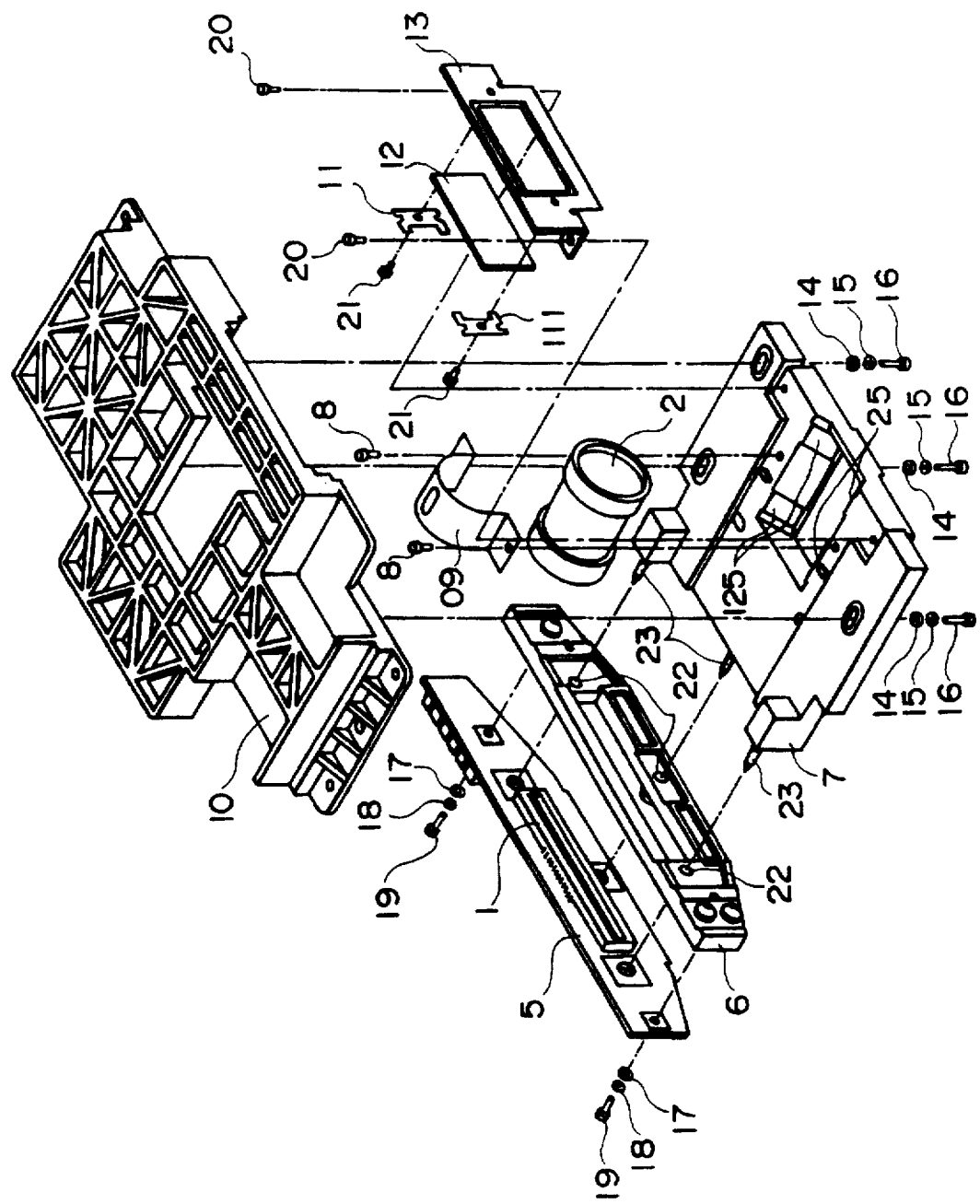
FIG. 1 is an exploded perspective view showing an embodiment according to the present invention.

The present invention provides a mounting structure of a solid-state image pickup element in an image reading-out apparatus comprising: a solid-state image pickup element, an image focusing lens for focusing image, a fixing member for fixing the solid-state image pickup element which further fixes the image focusing lens, a basic board having the solid-state image pickup element mounted thereon, and a support member for supporting the solid-state image pickup element on which said basic board is mounted so as to be detachable therefrom, wherein connecting portions are provided between the solid-state image pickup element fixing member and the solid-state image pickup element supporting member, wherein the connecting portion is bonded to the solid-state image pickup element fixing member after adjusting the position of the solid-state image pickup element supporting member, and wherein the rigidity of the solid-state image pickup element supporting member is made higher than that of the basic board having the solid-state image pickup element mounted thereon.

Since the mounting structure of the image pickup element according to the present invention is constructed as mentioned above, the solid-state image pickup element is mounted on the basic board firstly, the basic board having the element mounted thereon is further mounted on the solid-state image pickup element supporting member secondly, and the supporting member is grasped by the adjusting jig finally. And further, the solid-state pickup element fixing member is also grasped by the adjusting jig. Both of the supporting member and the fixing member is connected to each other by use of the connecting portion. The solid state image pickup element supporting member is moved with the jig so as to precisely position the image focused by the focusing lens onto the solid-state image pickup element. When the focused image is put on the predetermined position, the connecting portions to be connected are bonded so as to determine the position of the supporting member.

In the mounting structure of the solid-state image pickup element as mentioned heretofore, the connecting portions are constructed with a projection/hole portion provided on the fixing member for fixing the solid-state image pickup element and a hole/projection portion provided on the support member for supporting the solid-state image pickup element, and a gap portion between a projection part and a hole part of the projection/hole portion and the hole/projection portion is formed such that the injection side for injecting adhesive agent or the tip end side of the projection part turns out to be wide.

On this occasion, it is permitted to respectively provide a portion of constant diameter on the opposing positions of the projection portion and the hole portion forming the gap portion of the afore-mentioned connecting portions, it is also permitted to respectively provide an optical reflection film on the surfaces of the projection portion and the hole portion forming the gap portion of the afore-mentioned connecting portions, and it is also permitted to form the projection portion forming the gap portion of the afore-mentioned connecting portions with the member through which the light rays can be transmitted. Furthermore, it is desirable to construct the projection portion and the hole portion forming the gap portion of the afore-mentioned connecting portions and the adhesive agent for bonding both of the with the material having the same or approximately the same line expansion coefficient.

In the mounting method of the solid-state image pickup element as mentioned heretofore, the connecting portions are constructed with a projection/hole portion and a hole/projection portion, a gap portion between a projection part and a hole part of the projection/hole portion and the hole/projection portion is formed such that the injection side for injecting adhesive agent or the tip end side of the projection part turns out to be wide, and the connecting portions are bonded to each other by dispensing the adhesive agent into the said gap portion after performing the positional adjustment by use of a jig.

On this occasion, an optically-hardening type adhesive agent is employed as the afore-mentioned adhesive agent. At the time of hardening the adhesive agent, it is preferable to radiate the light rays (ultraviolet light rays) are radiated from the wider gap portion side. Furthermore, it is permitted to perform bonding of the afore-mentioned connecting portions by welding the projection portion instead of employing the adhesive agent. And further, it is desirable to set the amount of the above-mentioned adhesive agent or the amount of the welded projection portion such that the adhesive agent or the welded projection portion does not overflow from the surface of the connecting portion.

Since the mounting structure of the present invention is constructed as mentioned above, the solid-state image pickup element is mounted on the basic board firstly, and the basic board having the element mounted thereon is further mounted on the solid-state image pickup element supporting member secondly. Next, the solid-state image pickup element supporting member is connected to the solid-state image pickup element fixing member on which the focusing lens is fixed by use of the connecting portion formed with the hole portion and the projection portion. In such construction, the solid-state image pickup element fixing member is moved so as to precisely position the image focused by the focusing lens on the solid-state image pickup element. When the the image focused by the focusing lens is situated on the predetermined position, both of the connecting portions are bonded to each other by use of the adhesive agent after determining the mutual positions thereof.

In case that an optical reflection film is provided on the respective surfaces of the projection portion and the hole portion forming the gap between the connecting portions, the optically-hardening type adhesive agent is employed. Consequently, the radiated light rays are reflected on the optical reflection film surface and thereby the hardening of the adhesive agent is promoted (accelerated).

And further, in case that the projection portion is formed with the material capable of causing the light rays to pass therethrough, the radiated light rays pass through the projection portion and arrive at the rear side thereof and the radiation effect of the light rays can be enhanced.

Furthermore, in case that the projection portion and the hole portion both forming the gap portion and the adhesive agent are constructed with the materials having the line expansion rate (coefficient) equal or approximately equal to each other, there occurs very rarely a positional shift or deviation between the element supporting member and the element fixing member due to the thermal (temperature) variation.

Furthermore, since the adjustment of the mounting position of the supporting member and the fixing member is done by use of the jig, it is not necessary to provide the member for adjusting the position of mounting the solid-state image pickup element on the image reading-out apparatus itself.

And further, at time of radiating the light rays, since the light rays are radiated from the side of the wider width of the gap portion, the light rays are transmitted entirely through the gap portion and thereby the adhesive agent can be prevented from being not hardened at all or partially hardened.

On the contrary, in the case of utilizing the method of bonding both portions to each other by welding the projection portion without using any adhesive agent, it follows the cost required for the adhesive agent can be reduced.

And further, on that occasion, since the amount of the adhesive agent employed or the amount of the welded projection portion is previously set such that the adhesive agent or the welded projection portion does not overflow from the surface of the afore-mentioned connecting portions, the adhesive agent, etc. does not stick on the basic board even in case that the connecting portions are provided so as to pass through the basic board and thereby the basic board can be detached from the solid-state image pickup element supporting member without any trouble.

In the other status of the embodiment according to the present invention, a mounting structure of a solid-state image pickup element in an image reading-out apparatus comprises a solid-state image pickup element, an image focusing lens for focusing image, a main body for fixing the image focusing lens, a basic board having the solid-state image pickup element mounted thereon, and a supplementary member on which the basic board is mounted, the main body, the supplementary member, and the basic board are arranged in the direction of the light rays' advancing in the order of the above, the main body and the supplementary member are connected to each other by the connecting portions which can be adjusted in the six-axis directions, and a basic board mounting portion is located at the outer side of the standard mounting position of the solid-state image pickup element from the connecting portions for connecting the main body and the supplementary member, and further located at the right and left sides around the center of the solid-state image pickup element.

In such construction as described above, the mounting procedure of the solid-state image pickup is as shown below:

At first, the basic board having the solid-state image pickup element mounted thereon is mounted on the supplementary (auxiliary) member.

Next, the supplementary member is connected to the main body on which the focusing lens is fixed by use of the connecting portions. Thereafter, the supplementary member is moved so as to precisely position the image focused by the focusing lens on the solid-state image pickup element. When the focused image is put on the predetermined position, the position is fixed by bonding the connecting portions by use of the adhesive agent.

In such construction, since the basic board mounting portion is located at the outer side of the standard mounting position of the solid-state image pickup element from the connecting portions for connecting the main body and the supplementary member, and further located at right and left around the center of the solid-state image pickup element, there is no or very small probability that the basic board is curled (bent) after deciding and fixing the position, and there is also no fear that the positional deviation of the solid-state image pickup element occurs.

In this status of the embodiment of a mounting structure of a solid-state image pickup element in an image reading-out apparatus, a basic board comprises a hole portion, and the connecting portion for connecting the main body and the supplementary member is situated on the hole portion.

Furthermore, since the recess portion of the basic board is located at the connecting portions between the main body and the supplementary member, it is easy to fill the connecting portions with the adhesive agent through the hole portion of the basic board, and further it is also easy to perform the six direction (three axial and three rotational) adjustment.

In this status of the embodiment of a mounting structure of a solid-state image pickup apparatus in an image reading-out apparatus, the basic board is constructed so as to be detachable from the basic board mounting portion of the supplementary member.

Furthermore, since the basic board is so constructed that it can be detached from the basic board mounting portion of the supplementary member, it is possible to take out only the basic board of the solid-state image pickup element and employ the same once again.

In this status of the embodiment of a mounting structure of a solid-state image pickup element in an image reading-out apparatus, the connecting portions are constructed with a projection/hole portion provided in the main body and a hole/projection provided in the supplementary member, and the adhesive agent is filled in the gap portion formed between the projection part and the hole part such that the volume of the filled adhesive agent turns out to be not larger than the volume of said gap portion.

Since the amount of the employed adhesive agent is smaller than the volume of the gap space in the connecting portions between the main body and the supplementary member, the adhesive agent does not overflow from the surface of the connecting portions. For this reason, there occurs no troublesome matter that the basic board cannot be detached from the supplementary member at the time of detaching it.

EMBODIMENTS

Figure 2:
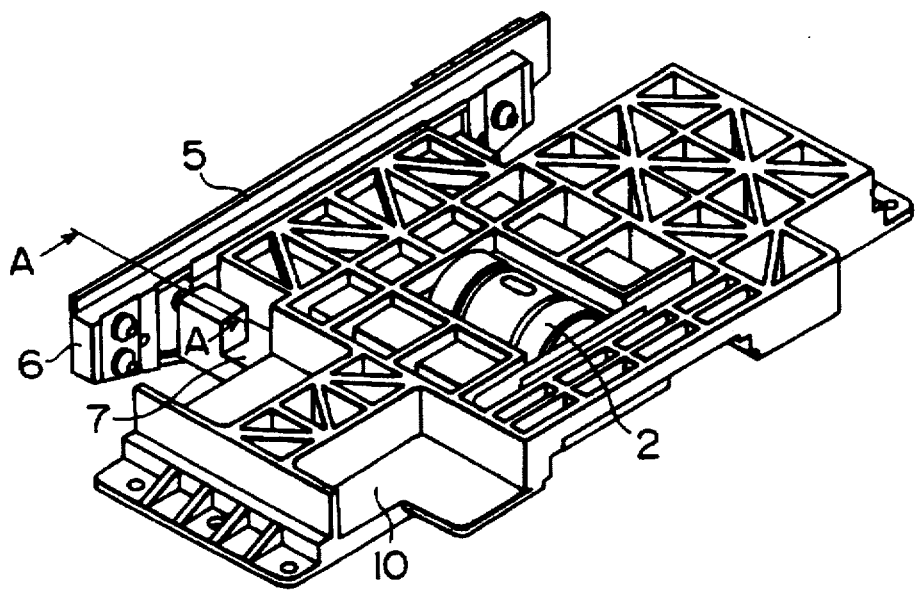
FIG. 2 is a perspective view of the embodiment according to the present invention.
Figure 3:
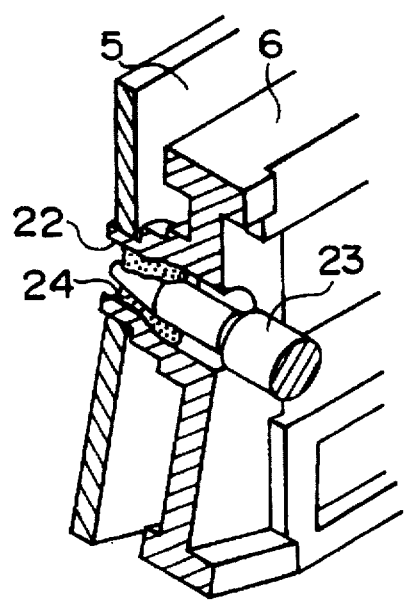
FIG. 3 is a perspective view showing the cross section taken along the line A—A in FIG. 2.

An embodiment of the present invention is concretely described hereinafter, referring to the drawings attached. FIG. 1 is an exploded perspective view showing an embodiment of an image reading-out apparatus. FIG. 2 is a perspective view showing a state of the assembled image reading-out apparatus. FIG. 3 is a cross-sectional view showing a cross-section taken along the line A—A in FIG. 2 showing the assembled image reading-out apparatus.

As shown in FIG. 1, a solid-state image pickup element (called "CCD"—Charge Coupled Device, hereinafter) 1 is connected by soldering to a solid-state image pickup element basic board 5 which is fixed on a solid-state image pickup element supporting member 6 with screws 19. On this occasion, a spring washer 18 and a flat washer 17 are inserted through the respective screws 19.

The element supporting member 6 is constructed with a material having the rigidity higher than that of the image pickup element basic board 5, so that the same member 6 is hardly distorted at the time of chucking it with an image forming jig when the adjustment of deciding the position is done as mentioned below.

The supporting member 6 is fixed with the adhesive agent on a solid-state image pickup element fixing member 7. To state in more detail, a projection portion 23 of the fixing member 7 is inserted in a hole portion 22 of the supporting member 6 and the adhesive agent 24 fills the space therebetween as shown in FIG. 3, and thereby the projecting portion 23 is fixed in the hole portion 22.

In such construction, although three-positions adhering portions exist in the portion 22, it is sufficient to provide more-than-one adhering position therebetween and the number of the adhering positions is not limited to "three".

Furthermore, the fixing member 7 has a V-block portion 25 and an image focusing lens 2 is put on the V-block portion 25, and a plate spring 9 for pressing the lens is disposed thereon. The focusing lens 2 is fixed on the V-block portion 25 by tightening screws 8 through the plate spring 9. An optical filter supporting member 13 is fixed on the fixing member 7 by screws 20. An optical filter 12 for adjusting the spectrum transmission rates of R (Red), G (Green), and B (Blue) to the respective predetermined values is fixed on the light filter supporting member 13 with screws 21 by use of an optical filter pressing plate 11.

And further, the solid-state image pickup element fixing member 7 is fixed on the main body mounting member 10 by screws 16 through flat washers 14 and spring washer 15. Furthermore, the mounting member 10 is fixed on the main body of the image reading-out apparatus not shown in FIGS. 1–3.

Next, the image reading-out apparatus of the embodiment according to the present invention is explained hereinafter, in the order of the positional adjustment procedure and the fixing procedure both of the CCD 1 and the focusing lens 2.

At first, the focusing lens 2 is fixed on the solid-state image pickup element fixing member 7 by the screws 8 through the lens pressing plate spring 9. And further, the fixing member 7 is fixed on the main body mounting member 10 by the screws 16 through the flat washers 14 and the spring washers 15.

Figure 4:
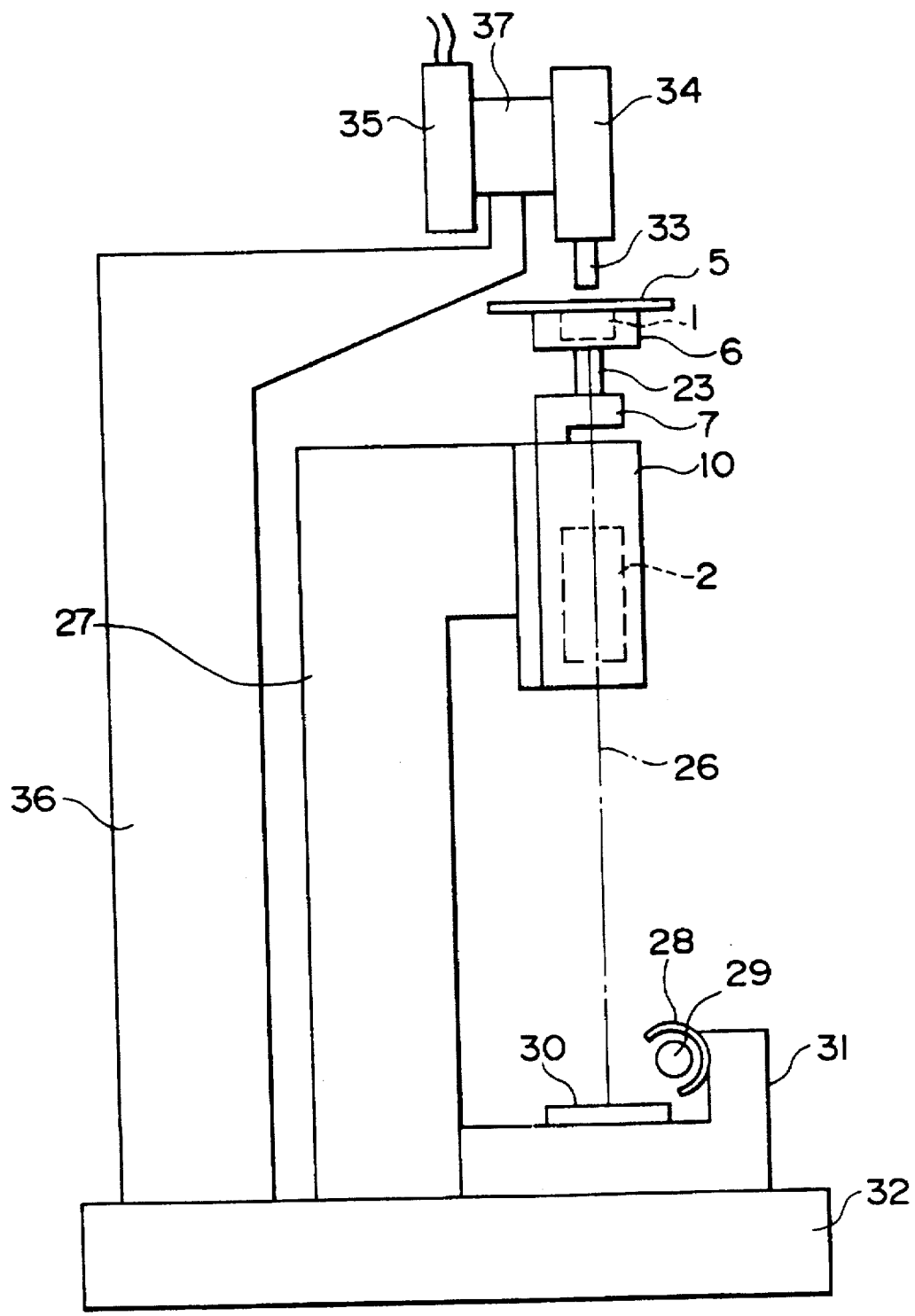
FIG. 4 is an explanatory side view illustrating the positional adjustment by use of an image forming jig.

Next, in the state of being thus assembled, the assembled unit is installed on the image forming jig as shown in FIG. 4. The image forming jig is constructed with a surface plate 32 having an image reading-out apparatus supporting member 27 and a light source chart supporting member 31 both mounted thereon. A chart glass 30, a light source 29, and a reflection plate 28 for use in the light source 29 are disposed on the light source chart supporting member 31, A chart capable of detecting the optical characteristics; to state more concretely, focus, magnification, inclination of optical axis, etc. is formed on the surface of the chart glass 30. The image forming jig of the present embodiment can light up the light source 29 and radiate the light rays reflected on the reflection plate 28 for use in the light source 29 onto the chart glass 30.

Consequently, the above-mentioned assembling members are installed on the image reading-out apparatus supporting member 27, and thereby the chart image is focused on the focusing plane through the focusing lens 2.

Moreover, the solid-state image pickup element basic board 5 having the CCD 1 connected and fixed thereon by soldering is fixed on the solid-state image pickup element supporting member 6 by the screws. The supporting element 6 is grasped by the chucking portion of the solid-state image pickup element.

And further, movable means not shown which can be moved in six directions of x, y, z, α, β, and γ is included in the chucking portion of the solid-state image pickup element.

Furthermore, since the supporting member 6 is formed with the member having the rigidity higher than that of the solid-state image pickup element basic board 5, the same member 6 is hardly distorted even at the time of being grasped by the chucking portion of the solid-state image pickup element, and thus the effect exerted on the basic board 5 compared with the case of directly grasping the basic board 5 turns out to be very small.

And further, the solid-state image pickup element fixing member 7 fixing the focusing lens 2 is grasped by the chucking portion of the fixing member 7 not shown in the figure(s) having movable means that can be moved in the direction of the optical axis 26. In such a construction, the chart image is optoelectrically converted by the CCD 1, the optical characteristics such as focus, magnification, inclination of optical axis, etc. are obtained with operational calculation, and both of the above-mentioned solid-state image pickup element chucking portion and solid-state image pickup element fixing member chucking portion are moved so as to make the optical characteristic equal to a predetermined necessary value. The positional adjustment is done in such manner as mentioned above.

After finishing the positional adjustment, the fixing procedure is done. On the surface plate 32, there is provided an adhesive agent dispensing jig constructed with an adhesive agent dispensing unit 34, a nozzle 33, a UV tight radiating portion 35, a radiating portion changing-over portion 37 for the adhesive agent dispensing unit 34, and an adhesive agent dispensing portion supporting stand 36. An ultraviolet-rays hardening type adhesive agent is dispensed on the connecting portions formed by the hole part 22 and the projection part 23 of the element supporting member 6 and the element fixing member 7 by use of the above-mentioned adhesive agent dispensing jig. Thereafter, the radiating portion changing-over portion 37 for the adhesive agent dispensing unit 34 is operated, and thereby the UV light radiating portion 35 is moved such that the light rays radiated from the UV light radiating portion 35 enter the connecting portions as the incident light rays, and thereby the adhesive agent is hardened.

Moreover, it is permitted that the adhesive agent is dispensed before performing the positional adjustment, and thereafter the position is adjusted and the adhesive agent is hardened.

Figure 5:
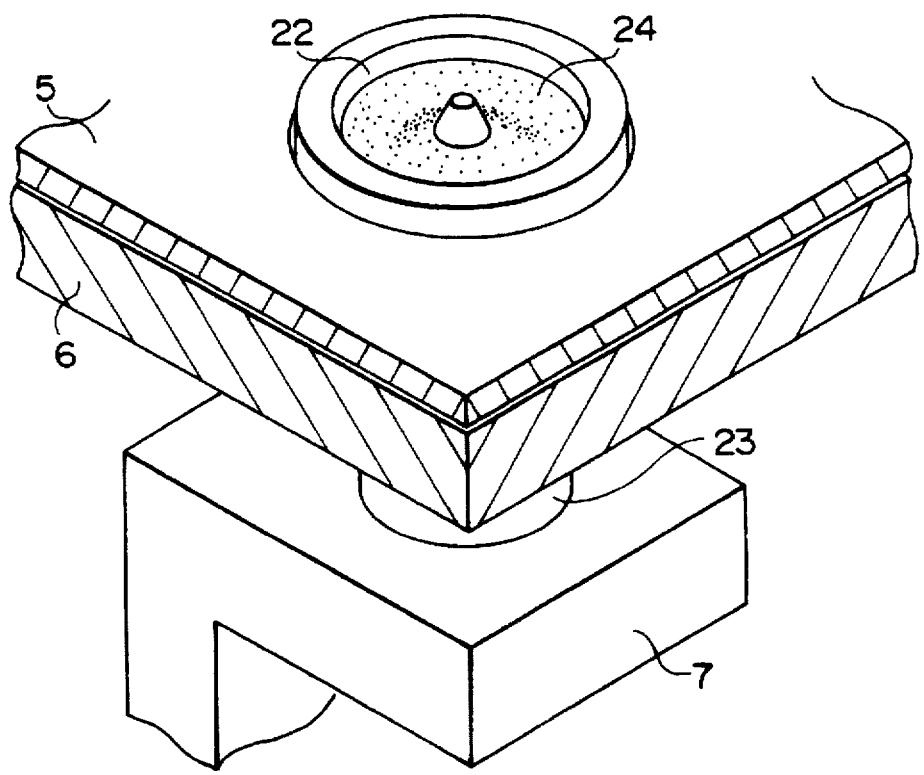
FIG. 5 is a perspective view of connecting portions.
Figure 6:
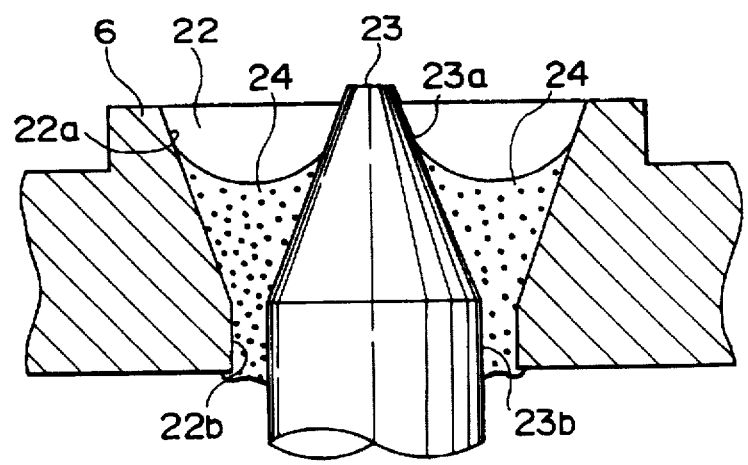
FIG. 6 is a cross sectional view showing a construction of the connecting portions.

Next, the construction of the connecting portions which is an adhering portion is explained hereinafter. FIG. 5 is an enlarged view showing the connecting portions. FIG. 6 is a cross-sectional view of the connecting portions. The hole part 22 which is a portion to be bonded is formed on the solid-state image pickup element supporting member 6. The projection part 23 formed on the solid-state image pickup element fixing member 7 is inserted into the hole part 22 of the supporting member 6.

The shape of the gap of the portion to be bonded which is formed by both of the hole part 22 and the projection part 23 is a tube having an uneven width (inner diameter). The width of the inlet side for injecting and dispensing the adhesive agent 24 is wide, while the width of the outlet side from which the adhesive agent 24 drops out (flows down) is narrow.

Namely, as shown in FIG. 6, the gap of the portion to be bonded is formed with the hole part 22 having a tapering portion 22a and a straight portion 22b and a bar-shaped projection part 23 having a tapering portion 23a and a straight portion 23b. The portions 22b and 23b respective constant diameter are disposed on the opposing positions.

Hereupon, in this embodiment, the hole part 22 and the projection part 23 are respectively provided on the supporting member 6 and the fixing member 7, and the gap portion for bonding is formed therebetween. On the contrary, it is permitted that the projection part and the hole part are respectively provided on the supporting member 6 and the fixing member 7, and the gap portion for bonding is formed therebetween.

Figure 7:
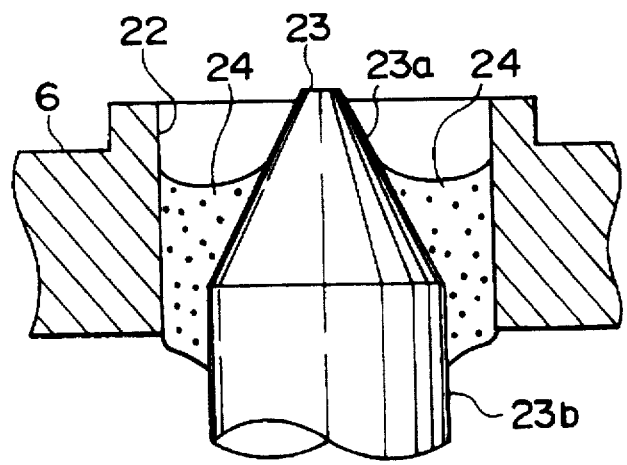
FIG. 7 is a cross sectional view showing another construction of the connecting portion.
Figure 8:
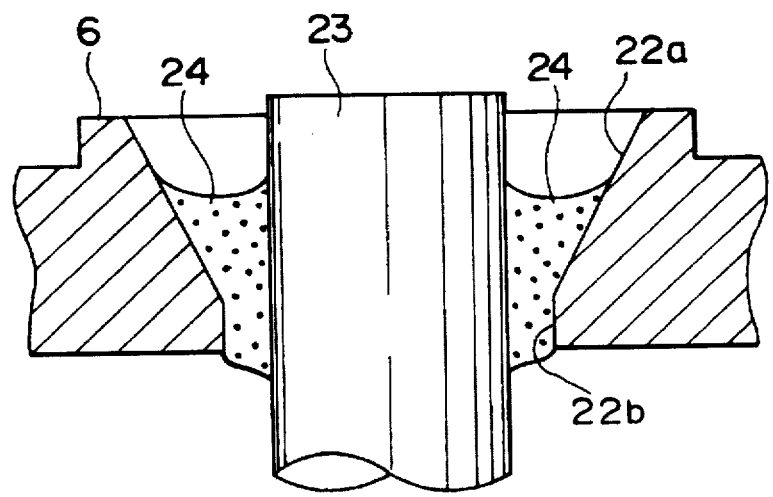
FIG. 8 is a cross sectional view showing still another construction of the connecting portion.

Moreover, as shown in FIG. 7, in addition to the above-mentioned, it is permitted to form the construction of the connecting portions with the hole part 22 having a straight portion and the bar-shaped projection part 23 having a tapering portion 23a and a straight portion 23b. On the other hand, as shown in FIG. 8, it is also permitted to form the construction of the connecting portion with the hole part 22 having a tapering portion 22a and a straight portion 22b and the bar-shaped projection part 23 having a straight portion.

Figure 9:
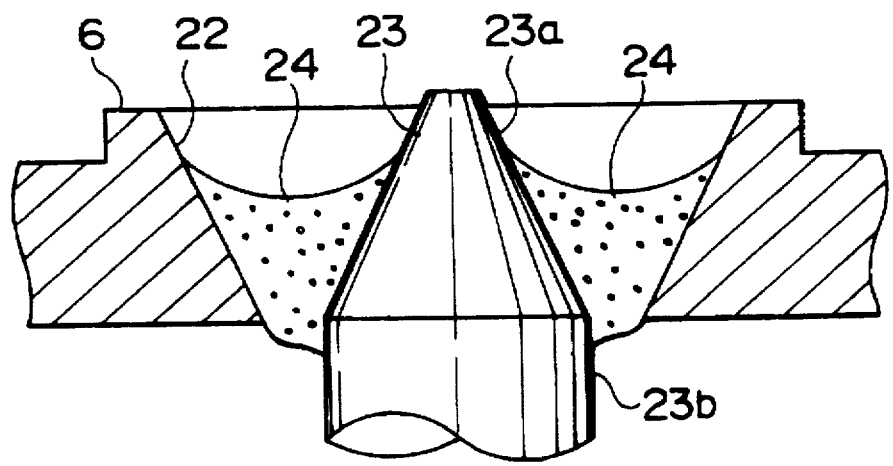
FIG. 9 is a cross sectional view showing still another construction of the connecting portion.
Figure 10:
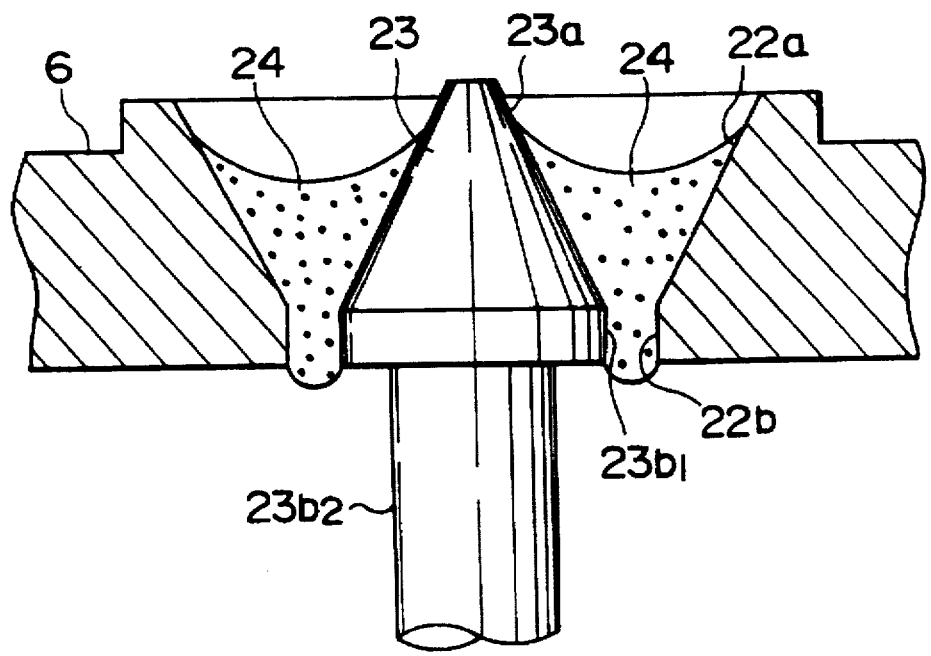
FIG. 10 is a cross sectional view showing still another construction of the connecting portion.

And further, as shown in FIG. 9, it is also permitted to form the construction of the connecting portion with the hole part 22 having a tapering portion and the bar-shaped projection part 23 having a tapering portion. Furthermore, as shown in FIG. 10, it is also permitted to form the construction of the connecting portion with the hole part 22 having a tapering portion 22a and a straight park 22b and the bar-shaped projection part 23 having a tapering portion 23a, a straight portion 23b$_1$ and another straight portion 23b$_2$ of different diameter. (The straight portion of small diameter is formed at the lower position which does not come into contact with the adhesive agent.)

Figure 11:
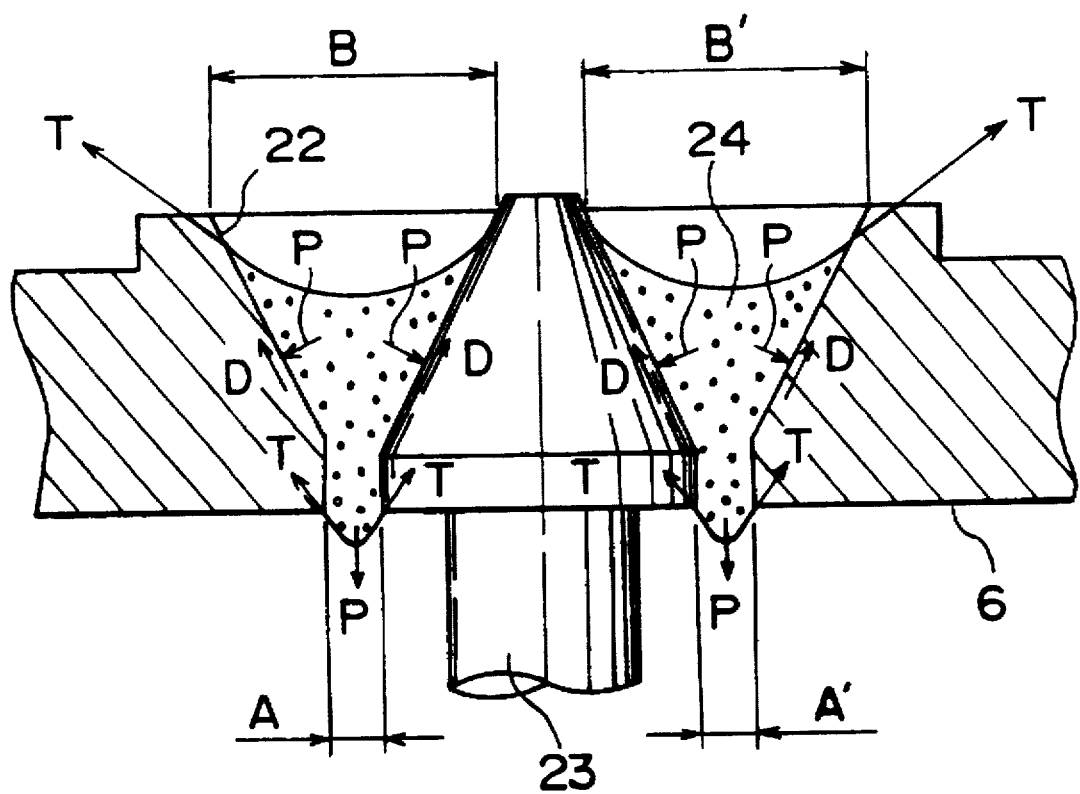
FIG. 11 is an explanatory cross sectional view illustrating the action of adhesive agent at the time of painting (pouring) the adhesive agent in the gap between the connecting portion.

Next, the action of the adhesive agent 24 in the case of dispensing the adhesive agent 24 on the above-mentioned gap portion is explained hereinafter. As shown in FIG. 11, the dispensed adhesive agent 24 does not flow out downward by the action of the surface tension T inherent to the adhesive agent, the friction resisting force D against the weight P of the adhesive agent, the pressure resisting force against the pressure in the interior of the adhesive agent not shown in the figure(s), and the dynamical balance (equilibrium) caused by the widths A and A' at the lowermost side of the gap portion, the density of the adhesive agent 24, and so on.

Moreover, if the B and B' portions are made further wide by changing the inclination of the tapering portion at the gap portion, the force of causing the adhesive agent 24 to flow out downward is further decreased, because of the increase of the friction resisting force D due to the weight of the adhesive agent 24 and the increase of the surface tension T occurring at the wider side of the gap portion. For this reason, the restricted range of the lo viscosity and the weight for the adhesive agent 24 is widened.

Next, a method of dispensing the adhesive agent 24 is explained hereinafter.

Figure 12:
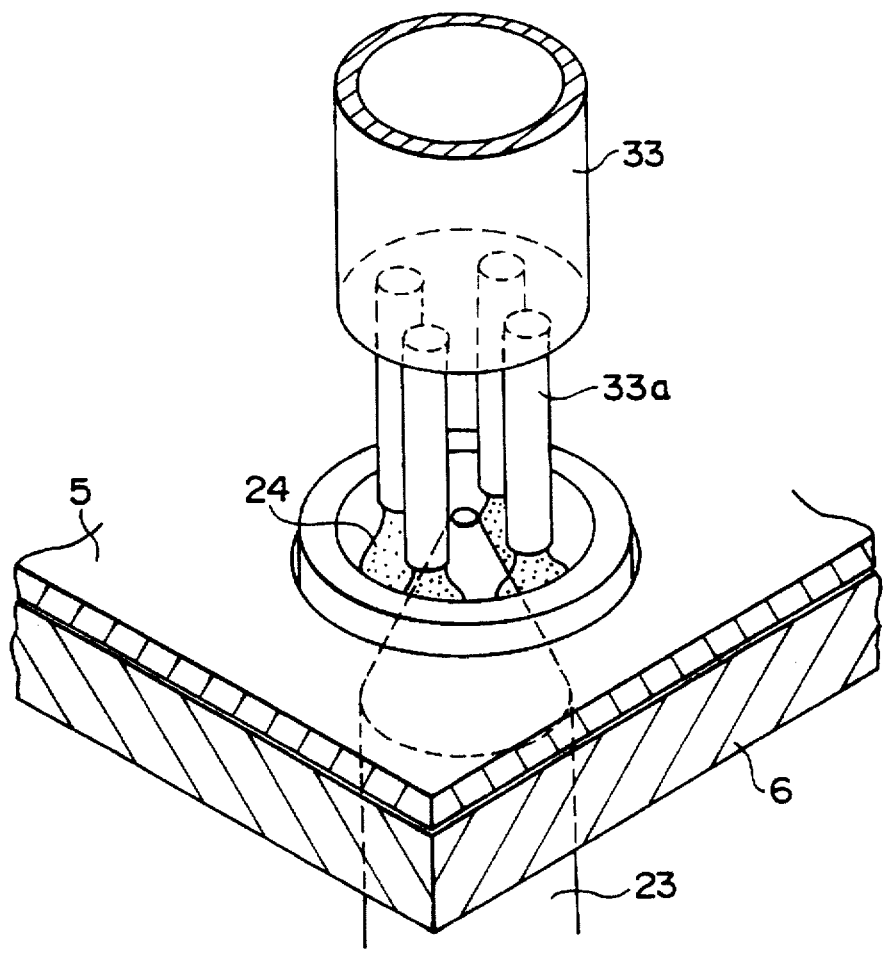
FIG. 12 is a perspective view showing a state of dispensing (painting or applying) the adhesive agent.

As shown in FIG. 12, the nozzle 33 installed on the adhesive agent dispensing jig approaches the gap portion formed by the hole part 22 of the solid-state image pickup element supporting member 6 and the projection part 23 of the solid-state image pickup element fixing member 7 from the upper side thereof, and the adhesive agent is dispensed on the surface of the gap portion. At this time, in order to dispense the adhesive agent on the surface thereof as quickly and uniformly as possible, it is ideal to dispose a large number of nozzle tip end portions 33a in the circumferential direction of the gap portion.

Figure 13:
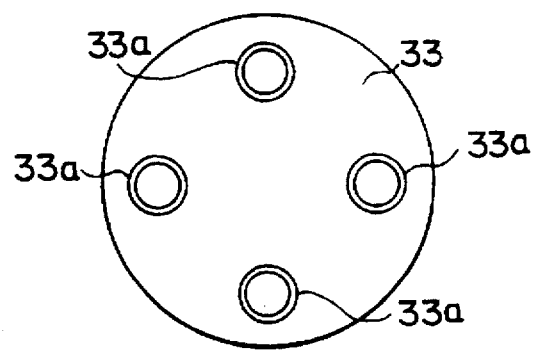
FIG. 13 is a cross sectional view showing the tip end portions of the respective nozzles.

The cross-sectional view of the nozzle tip end portions 33a is shown in FIG. 13. Since B and B' shown in FIG. 11 can be made wide, in accordance with the diameter of the nozzle tip end portions 33a, it is advantageous that the work of dispensing the adhesive agent can be done very easily and there occurs very rarely the misdispensing of the adhesive agent at the time of performing an automatic dispensing.

Next, a method of hardening the adhesive agent 24 is explained hereinafter. Since the adhesive agent 24 employed in the embodiment according to the present invention is an ultraviolet-rays hardening type adhesive agent, the ultraviolet rays 39 are radiated onto the adhesive agent 24 from the uppermost side for dispensing the adhesive agent by use of the UV light radiating portion 35, so as to harden the adhesive agent.

The hardening of the adhesive agent 24 advances from the surface of the side to be radiated by the ultraviolet rays 39- On this occasion, since the ultraviolet rays are radiated from the center axis direction of the tube-shaped gap portion for dispensing the adhesive agent, the hardening of the adhesive agent 24 advances in this direction. When the adhesive agent 24 is hardened, a force is generated by the action of the adhesive agent's contraction. On this occasion, since the generated force acts in the direction perpendicular to the center axis of the tube-shaped gap portion and further the force acts almost uniformly in the circumferential direction of the tube-shaped gap portion, the force is countervailed. Consequently, there scarcely occurs any positional deviation (shift) in the x and y directions of the solid-state image pickup element supporting member 6.

Figure 14:
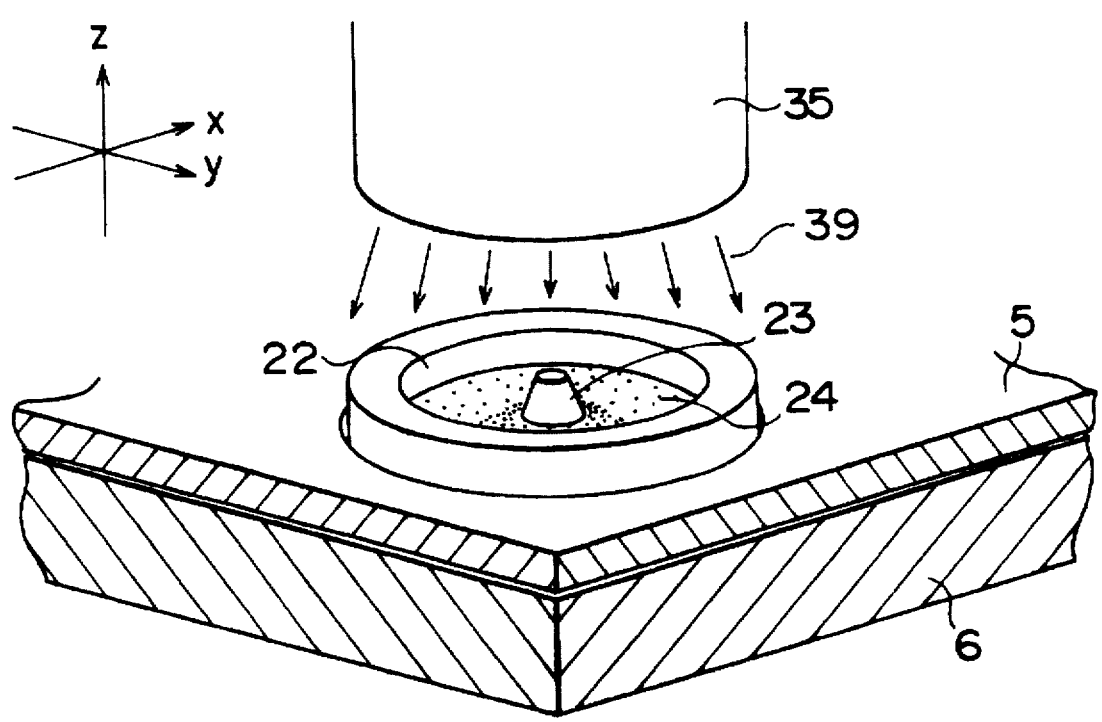
FIG. 14 is an explanatory perspective view illustrating a state of radiating the ultraviolet rays in order to harden the adhesive agent.

Moreover, although the ultraviolet rays are radiated from the upper part of the center axis direction of the tube-shaped gap portion as shown in FIG. 14, the same functional effect can be attained for the above-mentioned positional deviation (shift) even though the ultraviolet rays are radiated from the lower part thereof.

Furthermore, since there exists a tapering portion in the tube-shaped gap portion for dispensing the adhesive agent, when the adhesive agent is hardened the force acts even in the z direction and solid-state image pickup element supporting member 6 is moved in the z direction on some occasions, Assuming that the tube-shaped gap portion is constructed so as to have a straight portion on such occasions as shown in FIGS. 6, 7, 8 and 9, the supporting member 6 can be fixed on condition that the forces generated by the contraction of the adhesive agent in the x and y directions do not exert any influence on the supporting member 6, by radiating the ultraviolet rays from the lower side and hardening the adhesive agent from the straight portion of the tube-shaped gap portion. And further, the ultraviolet rays are radiated again from the upper side and the adhesive agent is hardened in the final stage. In such manner, the hardening of the adhesive agent can be finished without causing any positional deviation (shift).

Furthermore, when the ultraviolet rays are radiated from the upper side, the wider B and B' shown in FIG. 11 are, the more easily the ultraviolet rays can arrive at the lowermost (bottom) portion of the gap.

And further, it is possible to make short the hardening speed of the adhesive agent by employing a transparent material for the projection part 23 constructing the gap portion or by forming a reflection film (for instance, Al film, Ni film, etc.) on the surface constructing the gap portion.

Next, the materials employed for the adhesive agent 24 and the member to be bonded is explained hereinafter.

Usually, in such filling-type adhesion, since the adhesive agent and the member to be adhered is completely brought into direct contact with each other, when the thermal expansion occurs due to the thermal (temperature) variation, there occur some troublesome matters such as peeling-off of the connecting portions, cracking or breaking-down of the employed member, or the like. In such situation, if the line expansion coefficients (rates) of the adhesive agent and the member to be adhered are made almost equal to each other, the reliability regarding the thermal variation can be improved.

Although the adhesion at the connecting portion between the solid-state image pickup element supporting member 6 and the solid-state image pickup element fixing member 7 is done by dispensing the adhesive agent, it is also permitted to fuse the projection part 23 of the connecting portion and cause the fused part to adhere to the hole part 32 of the connecting portion.

As described heretofore, according to the present invention, since the rigidity of the solid-state image pickup element supporting member is made higher than that of the basic board on which the solid-state image pickup apparatus is mounted (connected thereto), the supporting member is scarcely distorted at the time of performing the positional adjustment. For this reason, the distortion of the supporting member is released after the positional adjustment, and consequently there occurs no troublesome matter that the adjusted positional relationship between the solid-state image pickup element mounted (connected) on the basic board and the focusing lens mounted on the solid-state image pickup element fixing member 7 deviates from the predetermined.

Furthermore, since the external force does scarcely exert any influence on the above respective elements, there scarcely occur similar troublesome matters as mentioned above.

In such manner, the present invention has the functional effects as mentioned above that the solid-state image pickup element can be assembled with high precision and thereafter reduce or eliminate the occurrence of the positional deviation (shift).

According to the first status of the second embodiment group, after performing the positional adjustment between the solid-state image pickup element and the focusing lens, the adhesive agent is dispensed from the wider side of the gap in the connecting portions between the solid-state image pickup element fixing member and the solid-state image pickup element supporting member and both elements are fixed to each other.

In such manner, it is possible to dispense the adhesive agent promptly, uniformly, and without any unevenness, and thereby the easiness of assembling the respective elements can be largely improved.

According to the second status of the second embodiment group, the adhesive agent at the position of constant diameter is hardened at first, and thereby the positional deviation at the time of fixing can be reduced.

According to the third status of the second embodiment group, the radiated light rays are reflected on the surfaces of the above-mentioned parts (members), and thereby the hardening of the adhesive agent can be promoted.

According to the fourth status of the second embodiment group, since the radiated light rays are transmitted onto the fear side of the projection part and further go therearound, the effect of the light rays' radiation can be enhanced.

According to the fifth status of the second embodiment group, there seldom occurs the positional deviation between the solid-state image pickup element supporting member and the solid-state image pickup element fixing member due to the thermal variation.

According to the sixth status of the second embodiment group, the positional adjustment between the supporting member and the fixing member is done by use of the jig, and after the adjustment the connecting portions are firmly fixed. Consequently, it is not necessary to install a member for adjusting the position of mounting the CCD on the image reading-out apparatus itself, and thereby the manufacturing cost can be reduced and the adjustment works turn out to be easy. Furthermore, the effect is same as that of the status.

According to the seventh status of the second embodiment group, the light rays can be entirely transmitted to the entire portions of the gap and thereby the not-hardened portion of the adhesive agent can be eliminated.

According to the eighth status of the second embodiment group, the cost required for the adhesive agent can be reduced.

According to the ninth status of the second embodiment group, even in case that the connecting portions are provided so as to pass through the basic board, since the adhesive agent does not stick to the basic board, there occurs no obstacle for taking out the basic board from the solid-state image pickup element supporting member. For this reason, even in case that a bad contacting state occurs, it is not necessary to abolish the expensive solid-state image pickup element and thereby the cost can be reduced.

ANOTHER EMBODIMENT

Another embodiment of the present invention is explained hereinafter, referring to the drawings; FIG. 15 through FIG. 18.

Figure 15:
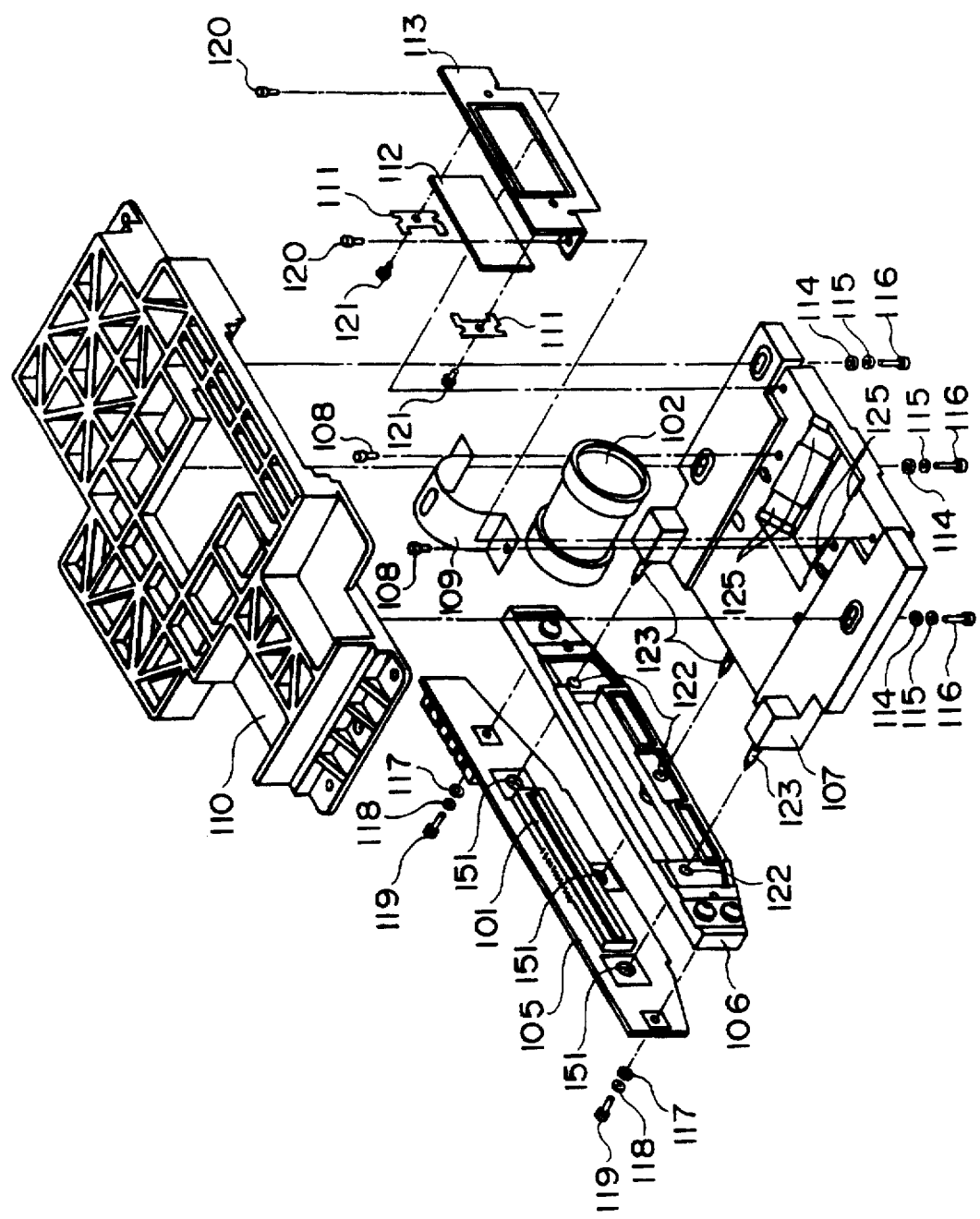
FIG. 15 is an exploded perspective view showing another status of the embodiment according to the present invention.
Figure 16:
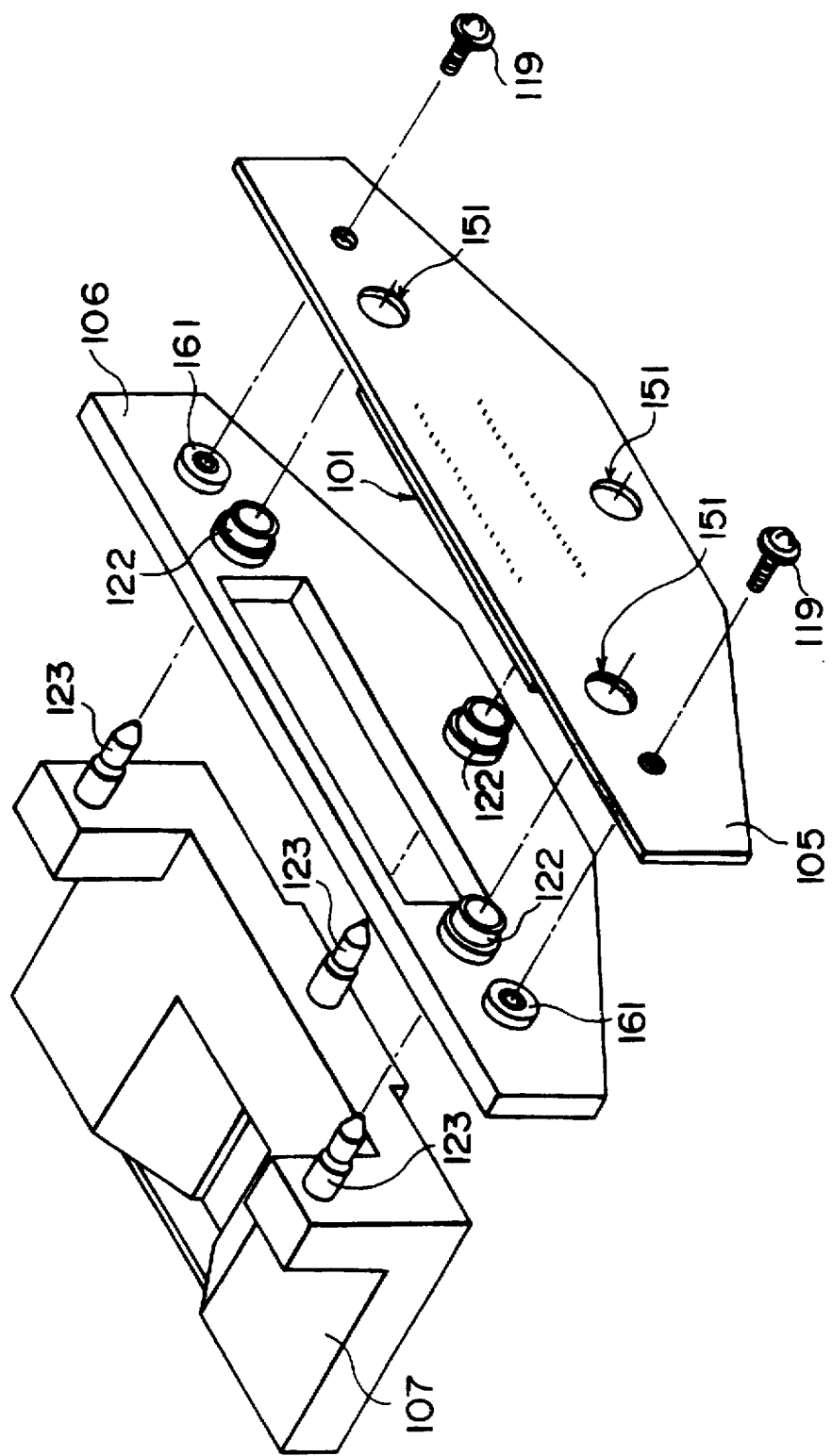
FIG. 16 is an exploded perspective view showing a basic board, a supplementary member and a main body viewing from the back surface side.

In FIG. 15, another embodiment of the image reading-out apparatus according to the present invention is shown by an exploded perspective view. FIG. 16 is an exploded perspective view seen from the back surface side of the basic board, the supplementary member, and the main body portion shown in FIG. 15.

Figure 17:
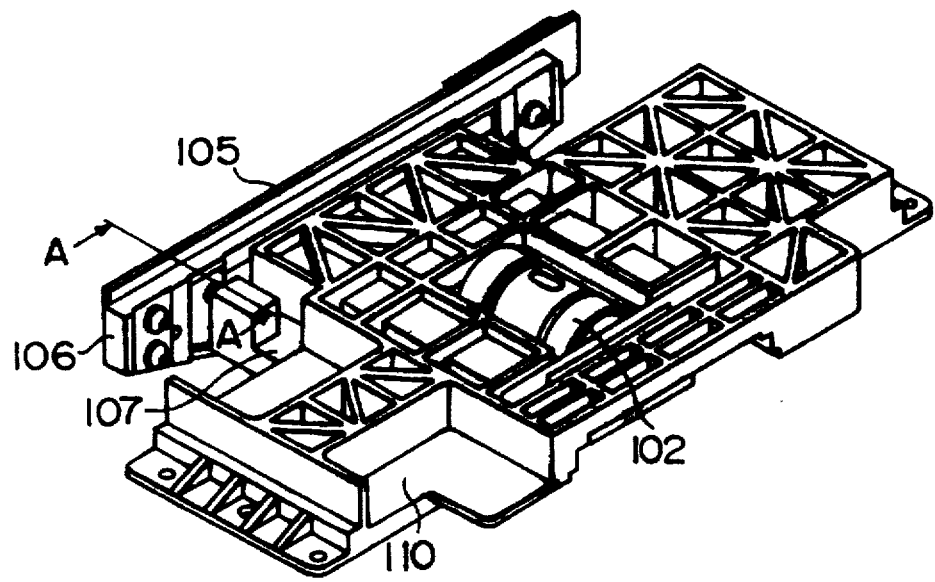
FIG. 17 is a perspective view showing the assembled structure shown in FIG. 18 according to the embodiment of the present invention.
Figure 18:
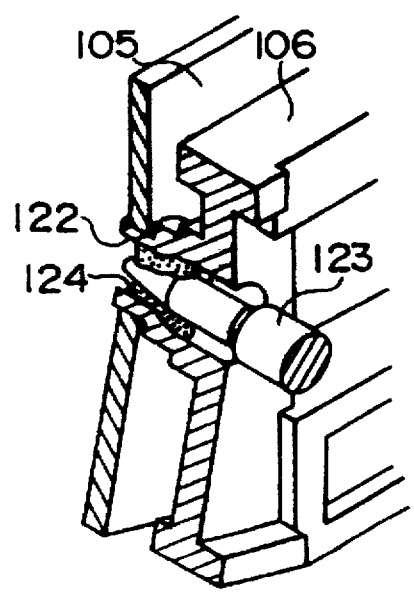
FIG. 18 is a perspective view showing the cross section taken along the line A—A in FIG. 17.
Figure 19:
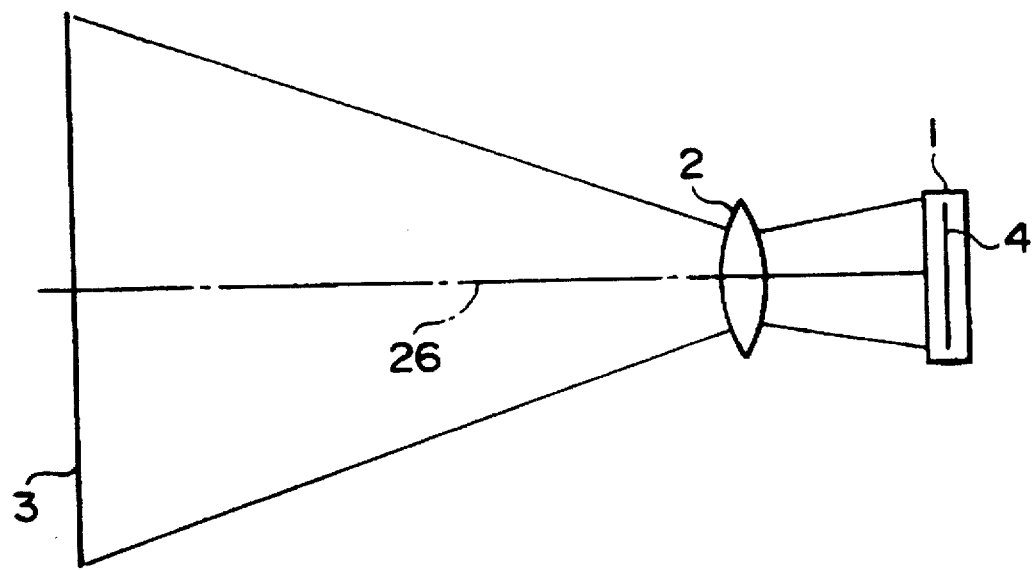
FIG. 19 is an outlined view showing a conventional apparatus for reading out the image by use of a solid-state image pickup element.
Figure 20:
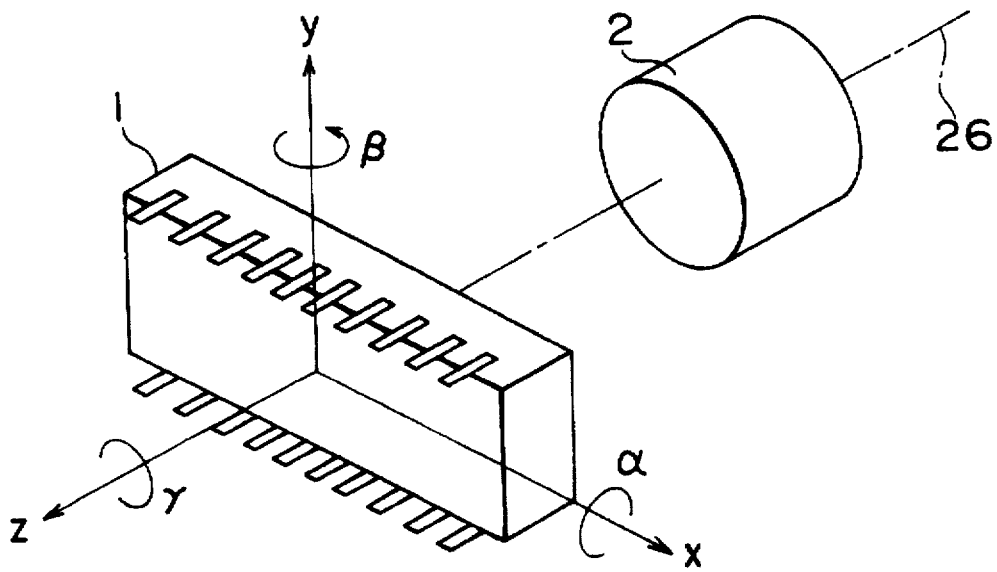
FIG. 20 is an explanatory perspective view illustrating the directions of the positional adjustment for the solid-state image pickup element shown in FIG. 19.
Figure 21:
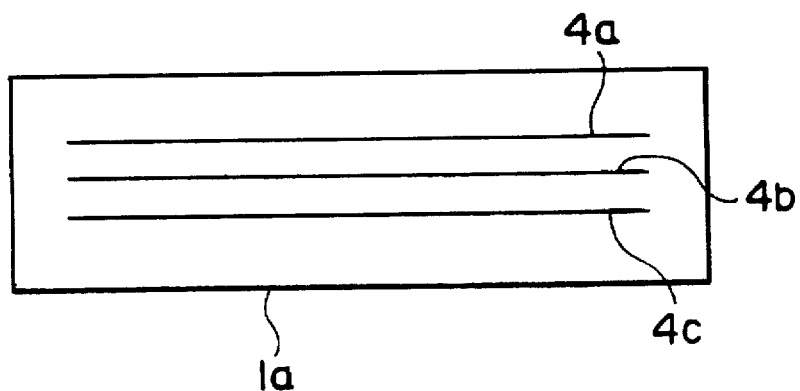
FIG. 21 is an explanatory view illustrating the relationship between the solid-state image pickup elements and the pixel lines.

FIG. 17 is a perspective view showing an assembling state of the image reading-out apparatus shown in FIG. 15. FIG. 18 is a cross-sectional view taken along the line A—A of the image reading-out apparatus shown in FIG. 17.

As shown in the respective figures; FIGS. 15, 16, and 17, a solid-state image pickup element (called "CCD", hereinafter) 101 is connected to a basic board 105 by soldering. The basic board 105 is fixed on a supplementary member 106 by screws 119 utilizing a basic board mounting portion 161 of the member 106. On this occasion, in order to ensure the fixing of the respective elements, spring washers 118 and flat washers 117 are respectively inserted to for both of the screws 119.

Moreover, the supplementary member 106 is constructed with a material having the rigidity higher than that of the basic board 105. When the positioning adjustment mentioned later is done, there scarcely occurs distortion at the time of chucking the supplementary member 106 with the image forming jig.

The supplementary member 106 is fixed on a main body 107 by use of the adhesive agent 124. To state in more detail, the connecting portions are constructed with a hole part 122 provided in the supplementary member 106 and a projection part 123 provided in the main body 107, the projection part 123 of the main body 107 is inserted into the hole part 122 of the connecting portions, and the adhesive agent 124 is dispensed thereon and the hole part 122 and the projection part 123 are bonded to each other as shown in FIG. 18.

A hole portion 151 is provided on the basic board 105. The connecting portions are situated at the basic board 105. Since the adhesion of the connecting portions are performed through the hole portion 151, it is easy to fill the gap with the adhesive agent, and further it is easy to perform an adjustment in a first axial direction along the direction of the light rays, second and third axial directions which are perpendicular to the first axial direction; and first, second and third rotational directions respectively around the first, second and third axial directions.

Since a basic board mounting portion 161 of the supplementary member 106 is situated at the outer side from the connecting portions 122 and 123 of the main body 107 and the supplementary member 106 around the standard mounting position of the CCD 101 and the same is disposed at the right and left sides around the CCD 101 located at center, it is a very rarely probable case that the basic board is bent with curvature by the action of heating, etc., and the mounting portion 161 is constructed with the structure not causing the positional deviation (shift) of the CCD 101.

Other parts of this embodiment are the same as the parts of the previous embodiment. So, the detailed descriptions thereof are omitted, here.

According to the embodiment of the present invention, since the basic board mounting portion of the supplementary member is located at the outer side of the connecting portions between the main body and the supplementary member from the standard mounting position of the solid-state image pickup element, and the same is located at the right and left sides thereof around the solid-state image pickup element, there is very small probability that the basic board is bent with curvature by the action of heat, etc., and there is no fear of causing the positional deviation of the solid-state image pickup element, after positioning and fixing.

Furthermore, since the hole portions are bored at the positions on which the connecting portions between the main body and the supplementary member are located, it is easy to fill the connecting portions with the adhesive agent through the hole portions of the basic board, and in addition, it is easy to perform the six adjustments in three axial and three rotational directions adjustment.

Furthermore, since the basic board is constructed such that the basic board can be attached to and detached from the basic board mounting portion of the supplementary member, only the basic board having the solid-state image pickup element mounted thereon can be removed from the supplementary member and employed over again.

Furthermore, since the connecting portions are constructed with the projection part/hole part provided on the main body and the hole part/projection part provided on the supplementary member and the gap portion formed by the projection part and the hole part is filled with the adhesive agent such that the amount of filled adhesive agent is equal to or smaller than the volume of the gap portion, the adhesive agent does not overflow from the surface of the connecting portions. For this reason, there occurs no obstacle that the basic board cannot be removed at the time of detaching that from the supplementary member.

STILL ANOTHER EMBODIMENT

Still another embodiment of the present invention is explained hereinafter.

The supporting construction of the embodiment comprises a chucking member which is a supporting member and a chucked member which is a supported member supported by the chucking member.

In the above chucking member, a recess portion is formed such that the portion is bored through the surface at the chucking side and the surface at the opposing side to the surface. Moreover, in this embodiment, the recess portion is straightly bored through between the surface at the chucking side and the surface at the opposing side to the surface. However, it is also permitted that the recess portion is bored through with curvature between the surface at the chucking side and the other surface not opposing to the surface or the surface which is the same as the above surface. And further, a stepped portion having a concave of larger diameter than that of the recess portion is formed at the edge portion of the chucking side of the recess portion. An O-ring is fixedly mounted under the chucking member through adhesive agent, and a vacuum pump is connected to the edge portion at the opposing side to the stepped portion of the recess portion through the exhausting tube. As the vacuum pump, for instance, a mechanical vacuum pump, an oil-rotational type vacuum pump, a scattering type pump, an ion pump, etc. can be employed.

The afore-mentioned chucked member comprises a solid-state image pickup element, an element basic board, and an element supporting member. The solid-state image pickup element is connected to the element basic board by soldering. The element basic board is fixed to the element supporting member by screws. The solid-state image pickup element supporting member is constructed with the material of higher rigidity than that of the solid-state image pickup element basic board. Thereby, there scarcely occurs the distortion when the supporting member is supported by the chucking member.

According to this embodiment, the projecting portion of the solid-state image pickup element supporting member of the chucked member is provided on the opposite surface to the surface on which the solid-state image pickup element. On this projecting portion, there is formed a tapering surface having an inclined surface, the tip end of which has a diameter smaller than the inner diameter of the O-ring, and the base end of which has another diameter larger than the inner diameter of the O-ring. The contacting portion is constructed such that the tip end of the projecting portion is inserted into the O-ring and the tapering surface is brought into tight contact with the inner circumference of the O-ring in a state of line-contacting. The vacuum pump creates a negative pressure state in the space S sealed by the O-ring and the tapering surface connected to the recess portion through the exhausting tube and the recess portion of the chucking member. In such construction, the chucked member is supported and fixed by sucking the projecting portion of the chucked member. And further, by releasing the negative pressure state of sucking the projecting portion, the chucking member can be disconnected from the chucked member.

A stopper member brought into direct contact with the chucking-side standard surface of the chucking member is provided at the place near the projecting portion of the afore-mentioned chucked member.

When the chucked member is chucked, the tapering surface of the projecting portion is inserted into the inner side of the O-ring. The inserting direction is called a "z-direction". When the vacuum pump operates and the gap between the O-ring and the tapering surface disappears and hermetically sealed, a chucking force is generated and thereby the chucked member is drawn in by suction in the z-direction. In proportion to the strength of the sucking force, the elastic O-ring is gradually deformed. The chucked member is fixed on the position where a stopper member disposed near the projecting portion of the chucked member collide with the standard surface at the side of chucking.

The height h (in the z-direction) of the stopper member at this time is determined as mentioned below. When the O-ring and the tapering surface begin to come into contact with each other, the stopper member and the standard portion at the side of chucking are not brought into contact with each other. When the suction makes progress and thereby the O-ring is elastically deformed by the action of sucking (before the deformation of the O-ring exceeds the elastic limit), the height h is established such that the stopper member and the standard surface at the side of chucking are brought into contact with each other. Namely, the stopper member is restricted so as to put the deformation of the O-ring within the elastic limit. Consequently, the height h of the stopper member is determined in accordance with the elastic force of the O-ring and the air sucking force of the vacuum pump.

Next, the case of the external force occurrence after chucking is explained hereinafter.

A force F occurs at the contact point of the O-ring and the tapering surface corresponding to the external force. The force F is divided into the component force Fa in a direction perpendicular to the inclined surface (tapering surface) and the other component force Fb parallel with the same inclined surface (tapering surface). The component force Fa is a force exerted in a direction of causing the distortion of the O-ring. The other component force Fb is a force of making an action to the friction between the O-ring and the tapering surface.

Those component forces Fa and Fb are expressed, respectively, as follows:

$Fa=Fsin\theta$, and $Fb=Fcos\theta$

Consequently, in accordance with a method of taking the angle $\theta$ of the tapering surface, the relationship between the component force Fa and the other component force Fb is changed. For instance, by increasing the angle $\theta$ (friction angle) of the inclined surface, the value of $Fcos\theta$ is decreased and thereby the component force Fb can be made small.

According to the fact as mentioned heretofore, all of the force F occurring at the contact point does not act on the rolling friction of the O-ring and the tapering surface, but only the component force Fb acts on the rolling friction thereof. Consequently, if the elasticity of the O-ring is set such that the amount of the positional deviation of the chucked portion due to the deformation of the O-ring is made smaller than that of the positional deviation in case that the component force Fa is assumed to act on the rolling friction thereof, the positional deviation in the directions; x and y can be further reduced, compared with the prior arts. Furthermore, if the space between the inclined surface and the recess portion can be hermetically sealed, the elastic body other than the O-ring can be employed. And further, if the inclined surface and the recess portion can be sealed therebetween, the body other than the elastic body can be employed.

Next, the entire construction of the chucked portion is explained hereinafter.

Figure 23:
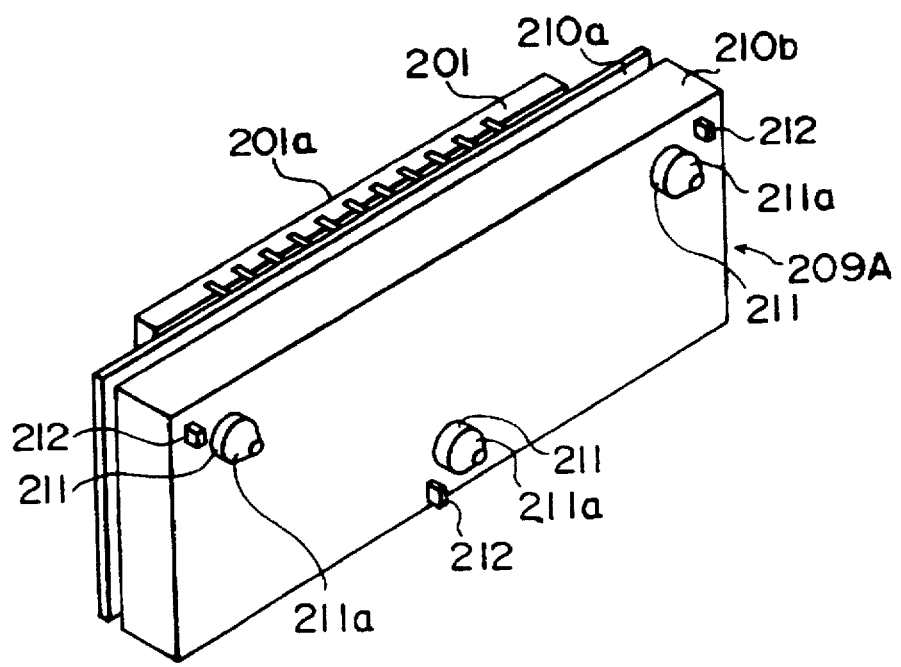
FIG. 23 is a perspective view showing the structure of a chucked member according to an embodiment status.

FIG. 23 is a perspective view showing the structure of the chucked member. The chucked member 209A comprises a solid-state image pickup element 201, a solid-state image pickup element basic board 210a to be soldered on the rear surface at the opposite side to the pixel surface 201a of the solid-state image photographing element 201, and a solid-state image pickup supporting member 210b for fixing the rear surface of the solid-state image pickup element basic board 210a by use of screws, etc. On the rear surface of the supporting member 210b, projecting portions 211 are unitarily formed, respectively, at the right and left sides and at the lower side. Furthermore, stopper members 212 are unitarily formed, respectively, near the projecting portions 211. Namely, the projecting portions 211 and the stopper members 212 can be formed unitarily together with the supporting member 10b. Or, otherwise, the separated ones can be fixed to the supporting member.

Figure 24:
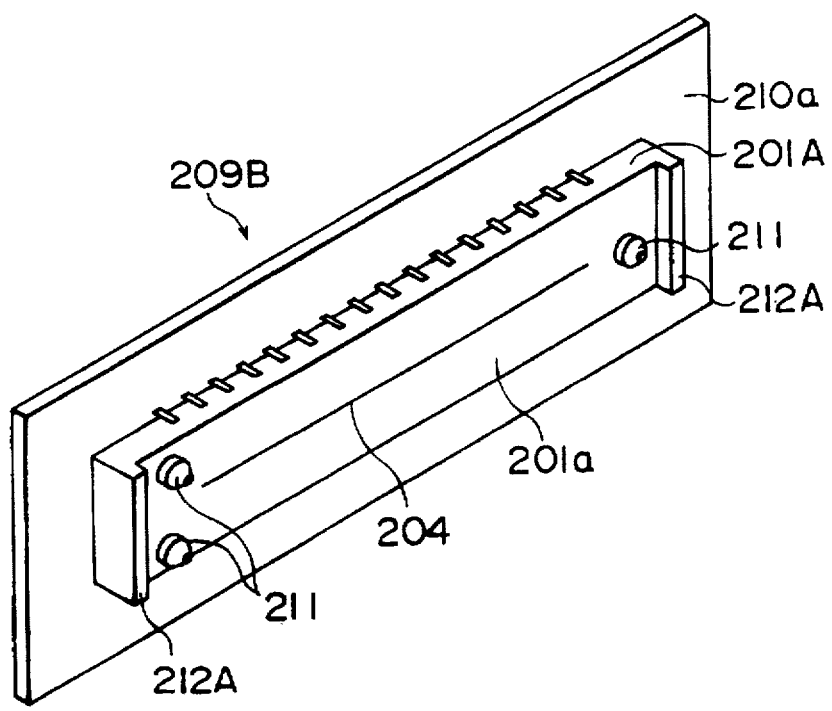
FIG. 24 is a perspective view showing the structure of the chucked member according to another embodiment status.

FIG. 24 is a perspective view showing another construction of a chucked member. The chucked member 209B comprises a solid-state image pickup element 201A and a solid-state image pickup element basic board 210a which is soldered on the rear surface at the opposite side to that of the pixel surface 201a having a pixel line 204 of the solid-state image pickup element 201A exposed thereon. And further, a projecting portion 211 and a stopper portion 212A are unitarily formed on the package itself of the solid-state image pickup element 201A. Since those unitary elements are supported by the projecting portion directly mounted on the solid-state image pickup element 201, there exists very small error factor between the solid-state image pickup element 201A. Therefore, the element 201A can be positioned and supported with high accuracy.

Figure 25:
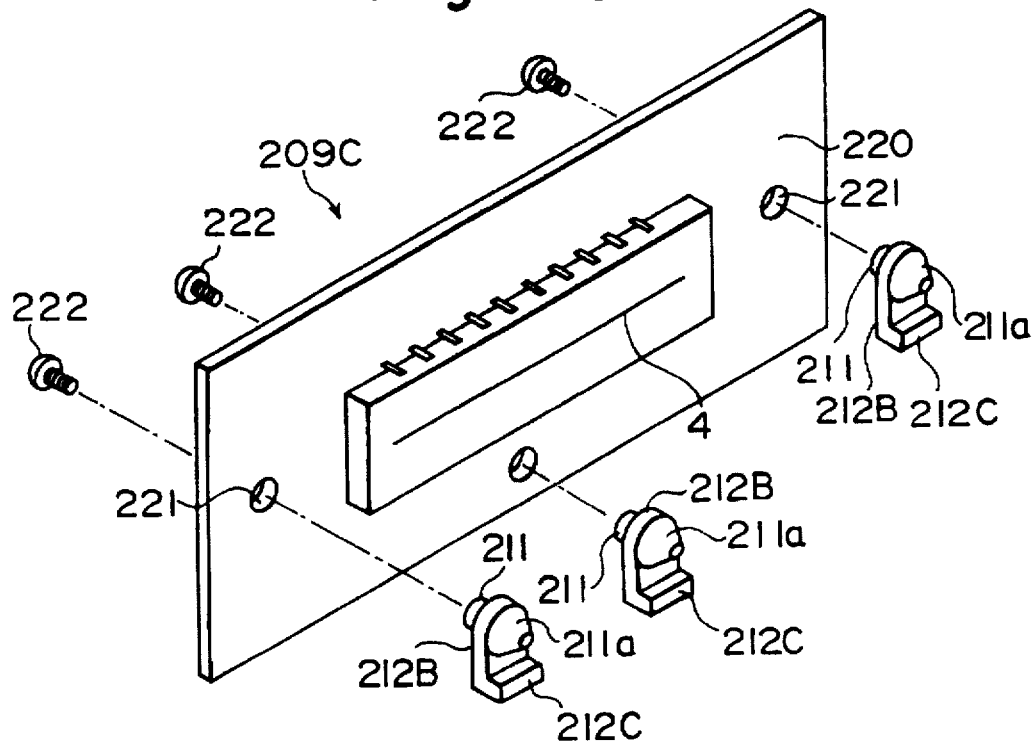
FIG. 25 is a perspective view showing the structure of the chucked member according to still another embodiment status.

FIG. 25 is a perspective view showing still another construction of a chucked member. In the chucked member 209C, an L-shaped member 212B is fixed on the solid-state image pickup element basic board 220 on which a solid-state image pickup element 201 is soldered by use of screws 222 through holes 211 bored through the front and rear sides of a solid-state image pickup element basic board 210a. A projecting portion 211a is formed on the upper part of the L-shaped member 212B, and a stopper member 212C projecting in a same direction as that of the projecting portion 211a on the lower edge portion thereof. Both are formed unitarily. And further, a cylindrical portion 211b which is inserted through the hole 221 of a solid-state image pickup element basic board 220 and has a female screw formed therein is formed at the opposite side to that of the projecting portion 211a of the L-shaped member 212B.

It is permitted to unitarily form the projecting portion 211a, the L-shaped member 212B, and the cylindrical portion 211b. Furthermore, it is also permitted to unitarily form the projecting portion 211a and the cylindrical portion 211b, form same hole as the hole 221 of the basic board 220 on the L-shaped member 212B, and insert the cylindrical portion 211b through the above hole.

Hereupon, the number of the chucking portions where the projecting portion 211 is formed is three in FIG. 23, FIG. 24, and FIG. 25. However, it is permitted to form one or more chucking portions.

In consideration of the stability for fixing the chucked member 209, it is desirable to form three chucking portions.

Furthermore, in the case of forming plural chucking portions, needless to mention, it is preferable to form those chucking portions at the positions distant from each other.

Furthermore, when the chucking is done, the structure as shown in FIG. 24 is desirable for precisely determining the positional relationship between the standard surface 206e at the chucking side and the solid-state image pickup element 201 or 201A. On the other hand, the structure as shown in FIG. 23 or the structure as shown in FIG. 25 is desirable for realizing more low-cost structure in case that the positional precision is not required in particular. And further, in order to form the projecting portion 211 and the stopper member 212 of the chucked member 209, it is easy in mechanical processing and advantageous in manufacturing and cost to form those elements 211 and 212 as the different member from the solid-state image pickup element 201.

Figure 22:
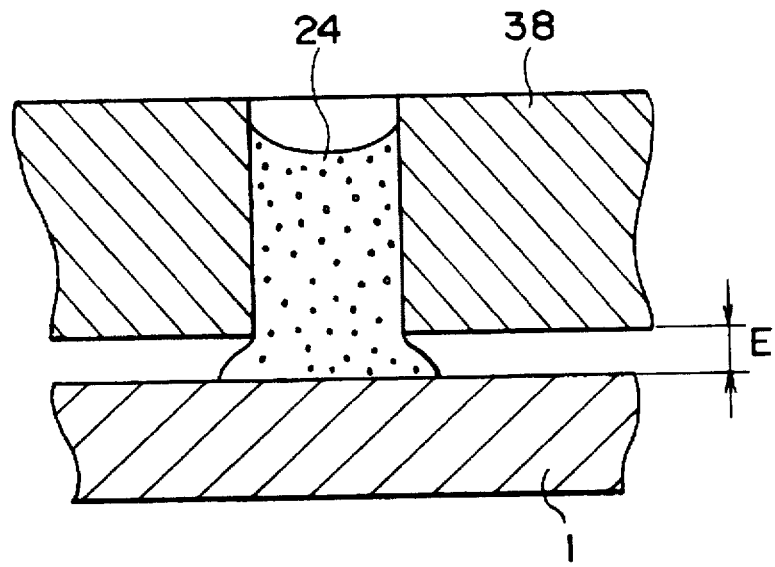
FIG. 22 is a cross sectional view illustrating an unfavorable state occurring in the gap portion in the prior art.

Moreover, it is permitted to form the afore-mentioned inclined surface as a tapering triangular conical surface as illustrated in FIG. 22. However, otherwise, it is also permitted to form the inclined surface as a spherical surface or a tapering triangular conical surface.

In the afore-mentioned embodiments, the case in which the projecting portion is provided on the chucked member and the hole portion is provided on the chucking member is explained heretofore. However, it is also permitted to provide the hole portion on the chucked member and projecting portion on the chucking member. On this occasion, for instance, it is necessary to form only the stepped portion without causing the hole portion to entirely pass through the chucked member and form a sucking hole on the projecting portion.

Furthermore, in the afore-mentioned embodiments, the stopper member is provided on the chucked member and a standard surface on which the stopper member impinges is provided on the chucking member. However, it is also permitted to provide the stopper member on the chucking member and the standard surface on which the stopper member impinges on the chucked member.

Furthermore, on either one of the supporting member and the supported member supported by the supporting member, it is permitted to provide a projecting part (stopper member) projecting from one to another. Or, otherwise, it is also permitted to provide a projecting part (stopper member) projecting in the opposite direction, on another one of the supporting member and the supported member. The tip end surface of the projecting part is employed as the standard surface.

In the embodiment mentioned heretofore, the adjusted member is explained in the case of employing the solid-state image pickup element. However, the technical thought of the present invention can be applied not only to the above-mentioned but to the other case of holding the object required to be adjusted precisely.

As is apparent from the foregoing description, the supporting structure according to the present invention comprises:

a recess portion provided on either one of the supporting member and the supported member supported by the supporting member and a sealing member fixed in the recess portion, a projecting portion provided on another one and having an inclined surface for blocking up the above-mentioned recess portion via the sealing member, and sucking means for sealing the sealing member and the inclined surface communicating with the blocked-up space in the recess portion.

By use of the sucking means, the chucked member is suckingly fixed on the chucking member so as to be attached thereto or detached therefrom. Consequently, almost uniform chucking force can be generated in the six-axes directions and the rolling frictional force between the tightly contacting member and the inclined surface can be made small when the external force is applied thereto, compared with the prior art. Furthermore, when the supporting member releases the supporting of the supported member, it is possible to prevent the positional relationship from deviating (shifting). Consequently, in such construction as mentioned heretofore, the position of the adjusted member can be adjusted with high accuracy.

Furthermore, since the combinations of the projecting portion and the sealing member are respectively disposed on three or more positions, the supported member can be supported stably. Thereby, it is possible to adjust the position of the adjusted member with high accuracy.

Furthermore, since the sealing member is constructed with elastic material, deformation of the inclined surface coming into contact with the sealing member can be prevented and thereby the sealing characteristic for the inclined surface can be enhanced and the durability of the sealing member can be also enhanced.

Furthermore, since the mutual positions of the chucking member and the chucked member in the sucking direction can be kept constant and the sealing member constructed with the elastic material can be restricted within the limit of elasticity, the sealing member is not deformed plastically due to the increase of the sucking force, the sealing characteristic for the inclined surface is enhanced, and the high durability can be realized.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mounting structure for mounting a solid-state image pickup element in an image reading-out apparatus comprising:

a solid-state image pickup element;

an image focusing lens for focusing image;

a fixing member for fixing said solid-state image pickup element which further fixes said image focusing lens;

a basic board having said solid-state image pickup element mounted thereon, and a support member for supporting said solid-state image pickup element on which said basic board is mounted so as to be detachable therefrom, wherein connecting portions are provided between said solid-state image pickup element fixing member and said solid-state image pickup element support member, wherein said connecting portions adhere to said solid-state image pickup element fixing member after adjusting the position of said solid-state image pickup element support member, and wherein a rigidity of said solid-state image pickup element support member is made higher than that of said basic board having said solid-state image pickup element mounted thereon.

2. A mounting structure for mounting a solid-state image pickup element in an image reading-out apparatus comprising:

a solid-state image pickup element;

an image focusing lens for focusing image;

a fixing member for fixing said solid-state image pickup element which further fixes said image focusing lens;

a basic board having said solid-state image pickup element mounted thereon; and a support member for supporting said solid-state image pickup element on which said basic board is mounted so as to be detachable therefrom;

wherein connecting portions are provided between said solid-state image pickup element fixing member and said solid-state image pickup element support member;

wherein said connecting portions adhere to said solid-state image pickup element fixing member after adjusting the position of said solid-state image pickup element support member;

wherein said connecting portions are constructed with one of a projection portion or a hole portion provided on said fixing member for fixing said solid-state image pickup element and the other of the projection portion or the hole portion provided on said support member for supporting said solid-state image pickup element; and wherein a gap portion between a projection part and a hole part of said one projection portion or hole portion and the other projection portion or hole portion is formed such that an injection side for injecting adhesive agent or a tip end side of said projection part turns out to be wide.

3. A mounting structure for mounting a solid-state image pickup element in an image reading-out apparatus as defined in claim 2, wherein portions respectively having a constant diameter are provided on the positions opposing to each other of said projection part and said hole part forming said gap portion of said connecting portions.

4. A mounting structure for mounting a solid-state image pickup element in an image reading-out apparatus as defined in either one of claim 2 or claim 3, wherein an optical reflection film is formed on the surface of said projection part and said hole part for forming said gap portion of said connecting portions.

5. A mounting structure for mounting a solid-state image pickup element in an image reading-out apparatus as defined in either one of claim 2 or claim 3, wherein said projection part forms said gap portion of said connecting portions.

6. A mounting structure for mounting a solid-state image pickup element in an image reading-out apparatus as defined in claim 2, wherein said projection part, said hole part, and adhesive agent for forming said gap portion of said connecting portions are respectively constructed with materials having line expansion coefficients which are the same or approximately the same.

7. A mounting method for mounting a solid-state image element in an image reading-out apparatus, the method comprising the steps of:

providing connecting portions between a solid-state image pickup element fixing member and a solid-state image pickup element support member; and adhering said connecting portions to said solid-state image pickup element fixing member after adjusting a position of said solid-state image pickup element support member;

wherein said connecting portions are constructed with one of a projection portion or a hole portion provided on said fixing member for fixing said solid-state image pickup element and the other of the projection portion or hole portion provided on said support member for supporting said solid-state image pickup element;

the method comprising the further steps of:

providing a gap portion between a projection part and a hole part of said one projection portion or hole portion and the other projection portion or hole portion such that an injection side for injecting adhesive agent or a tip end side of said projection part turns out to be wide; and adhering said connecting portions to each other by painting said adhesive agent on said gap portion after performing the positional adjustment by use of a jig.

8. A mounting structure for mounting a solid-state image pickup element in an image reading-out apparatus as defined in claim 2, wherein an optically-hardening type adhesive agent is employed as said adhesive agent and light rays are radiated in a direction starting from the wider side of said gap portion at the time of hardening said adhesive agent.

9. A mounting structure for mounting a solid-state image pickup element in an image reading-out apparatus as defined in claim 2, wherein adhesion of said connecting portions is performed by fusing said projection part instead of employing said adhesive agent.

10. A mounting structure for mounting a solid-state image pickup element in an image reading-out apparatus as defined in claim 9, wherein a quantity of said adhesive agent or a fusing amount of said projection part are set or adjusted such that said adhesive agent or said fused projection part does not overflow from the surface of said connecting portions.

11. A mounting structure for mounting a solid-state image pickup element in an image reading-out apparatus as defined in claim 9, wherein a quantity of said adhesive agent or a fusing amount of said projection part are set or adjusted such that said adhesive agent or said fused projection part substantially correspond to a volume of the gap portion or less.

12. A mounting method for mounting a solid-state image element in an image reading-out apparatus, the method comprising the steps of:

providing connecting portions between a solid-state image pickup element fixing member and a solid-state image pickup element support member; and adhering said connecting portions to said solid-state image pickup element fixing member after adjusting the portion of said solid-state image pickup element support member;

wherein said connecting portions are constructed with one of a projection portion or a hole portion provided on said fixing member for fixing said solid-state image pickup element and the other of the projection portion or hole portion provided on said support member for supporting said solid-state image pickup element;

the method comprising the further step of:

providing a gap portion between a projection part and a hole part of said one projection portion or hole portion and the other projection portion or hole portion such that an injection side for injecting adhesive agent or a tip end side of said projection part turns out to be wide.

13. A mounting structure for mounting a solid-state image pickup element in an image reading-out apparatus comprising:

a solid-state image pickup element;

an image focusing lens for focusing image;

a main body for fixing said image focusing lens;

a basic substrate having said solid-state image pickup element mounted thereon; and a supplementary member on which said basic substrate is mounted, wherein said main body, said supplementary member, and said basic substrate are arranged in a direction of light rays advancing in the order of the above, wherein said main body and said supplementary member are connected to each other by connecting portions which permit positional adjustments between said main body and said supplementary member in a first axial direction along the direction of light rays, second and third axial directions perpendicular to said first axial direction, and first, second and third rotational directions respectively around said first, second and third axial directions, and wherein a basic substrate mounting portion is located at an outer side of a standard mounting position of said solid-state image pickup element from said connecting portions for connecting said main body and said supplementary member, and further located at right and left around a center of said solid-state image pickup element.

14. A mounting structure for mounting a solid-state image pickup element in an image reading-out apparatus as defined in claim 13, wherein said basic substrate comprises a hole portion, and said connecting portions for connecting said main body and said supplementary member are situated on said hole portion.

15. A mounting structure for mounting a solid-state image pickup apparatus in an image reading-out apparatus as defined in claim 13, wherein said basic substrate is constructed so as to be detachable from said basic substrate mounting portion of said supplementary member.

16. A mounting structure for mounting a solid-state image pickup element in an image reading-out apparatus as defined in claim 13, wherein said connecting portions are constructed with one of a projection portion or a hole portion provided in said main body and the other of the projection portion or hole portion provided in said supplementary member, and an adhesive agent is filled in a gap portion formed between said projection portion and said hole portion such that a volume of said filled adhesive agent substantially corresponds to a volume of said gap portion or less.

17. A supporting structure for supporting an adjusted member comprising:

a recess portion provided on either one of a supporting member and a supported member supported by said supporting member, a sealing member fixed in said recess portion, a projecting portion provided on another one of said supporting member and the supported member and having an inclined surface for blocking up said recess portion via said sealing member, and means for sealing said sealing member and said inclined surface communicating with blocked-up space in said recess portion.

18. A supporting structure for supporting an adjusted member as defined in claim 17, wherein combinations of said projecting portion and said sealing member are respectively disposed on three or more positions.

19. A supporting structure for supporting an adjusted member as defined in claim 17, wherein said sealing member is constructed with elastic material.

20. A supporting structure for supporting an adjusted member as defined in claim 19, wherein a standard surface is formed on either one of said supporting member and said supported member supported by said supporting member, and wherein a stopper member brought into direct contact with said standard surface for restricting deformation amount of said sealing member within elastic limit is formed on another one of said supporting member and said supported member supported by said supporting member.

21. A mounting structure for mounting a solid-state image pickup element in an image reading-out apparatus comprising:

a solid-state image pickup element;

an image focusing lens for focusing image;

a fixing member for fixing said solid-state image pickup element which further fixes said image focusing lens;

a basic board having said solid-state image pickup element mounted thereon, and a support member for supporting said solid-state image pickup element on which said basic board is mounted so as to be detachable therefrom, wherein said fixing member, said support member and said basic board are combined in the above order from inside to outside.

22. A mounting structure for mounting a solid-state image pickup element in an image reading-out apparatus as defined in claim 21, wherein connecting portions are provided between said solid-state image pickup element fixing member and said solid-state image pickup element supporting member, and wherein said connecting portions adhere to said solid-state image pickup element fixing member after adjusting the position of said solid-state image pickup element supporting member.

23. A mounting structure for mounting a solid-state image pickup element in an image reading-out apparatus as defined in claim 22, wherein the rigidity of said solid-state image pickup element supporting member is made higher than that of said basic board having said solid-state image pickup element mounted thereon.

24. A mounting structure for mounting solid-state image pickup element in an image reading-out apparatus as defined in claim 22, wherein said connecting portions are constructed with one of a projection portion or a hole portion provided on said fixing member for fixing said solid-state image pickup element and the other of the projection portion or hole portion provided on said support member for supporting said solid-state image pickup element; and wherein a gap portion between a projection part and a hole part of said one of said projection portion or hole portion and the other of the projection portion or hole portion is formed such that an injection side for injecting adhesive agent or a tip end side of said projection part turns out to be wide.

25. A mounting structure for mounting a solid-state image pickup element in an image reading-out apparatus comprising:
- a solid-state image pickup element;
- an image focusing lens for focusing image;
- a fixing member for fixing said solid-state image pickup element which further fixes said image focusing lens;
- a basic board having said solid-state image pickup element mounted thereon; and
- a support member for supporting said solid-state image pickup element on which said basic board is mounted so as to be detachable therefrom;

wherein:
- connecting portions are provided between said solid-state image pickup element fixing member and said solid-state image pickup element support member;
- said connecting portions adhere to said solid-state image pickup element fixing member after adjusting a position of said solid-state image pickup element support member;
- said connecting portions are constructed with a first portion provided on said fixing member for fixing said solid-state image pickup element and a second portion provided on said support member for supporting said solid-state image pickup element; and
- a gap portion between a first part and a second part of said respective first portion and said second portion is formed such that an injection side for injecting adhesive agent or a tip end side of one of first or second parts turns out to be wide.

26. A mounting structure for mounting a solid-state image pickup element in an image reading-out apparatus as defined in claim 25, wherein said first portion is a projection portion and said second portion is a hole portion.

27. A mounting structure for mounting a solid-state image pickup element in an image reading-out apparatus as defined in claim 25, wherein said first portion is a hole portion and said second portion is a projection portion.

28. A mounting structure for mounting a solid-state image pickup element in an image reading-out apparatus comprising:
- a solid-state image pickup element;
- a board for mounting the solid-state image pickup element thereon;
- a fixing member for fixing a lens; and
- a support member for attaching the board thereto, wherein the fixing member has a connecting portion which is fixed to a connecting portion of the support member.

29. A mounting structure for mounting a solid-state pickup element in an image reading-out apparatus as defined in claim 28, wherein the board is removably attached to the support member.

30. A mounting structure for mounting a solid-state pickup element in an image reading-out apparatus as defined in claim 28, wherein a rigidity of the support member is higher than a rigidity of the board.

31. A mounting structure for mounting a solid-state pickup element in an image reading-out apparatus as defined in claim 28, wherein the connecting portion of the support member is one of a projection portion or a hole portion, and the connecting portion of the fixing member is the other of the projection portion or hole portion.

32. A mounting structure for mounting a solid state pickup element in an image reading-out apparatus as defined in claim 31, wherein a gap portion formed by fitting the projection portion into the hole portion is filled with adhesive.

33. A mounting structure for mounting a solid-state pickup element in an image reading-out apparatus as defined in claim 31, wherein the projection portion is connected with the hole portion by melting the projection portion.

34. A mounting structure for mounting a solid state pickup element in an image reading-out apparatus as defined in claim 31, wherein the board is removably attached to the support member.

35. A mounting structure for mounting a solid-state pickup element in an image reading-out apparatus as defined in claim 34, wherein the fixing member, the support member and the board are arranged in this order, and a window which is formed in a center of the support member is provided in the support member so that a beam of light from the lens can be incident on the image pickup element therethrough.

36. A mounting structure for mounting a solid state pickup element in an image reading-out apparatus as defined in claim 32, wherein a hole is formed on the board in the same position where the connecting portion is located, and an amount of adhesion to fix the fixing member and the support member in the connecting portion by means of adhesion is not in excess of a volume of the gap portion that is formed between the projection portion and the hole portion.

37. A mounting structure for mounting a solid-state pickup element in an image reading-out apparatus as defined in claim 32, wherein the projection portion and the hole portion to be connected by the adhesive have a coefficient of linear expansion identical to or substantially the same as that of the adhesive.

38. A mounting structure for mounting a solid state pickup element in an image reading-out apparatus as defined in claim 32, wherein an amount of adhesion to fix the fixing member and the support member in the connecting portion by means of adhesion is not in excess of a volume of the gap portion that is formed between the projection portion and the hole portion.

39. A mounting structure for mounting a solid state pickup element in an image reading-out apparatus as defined in claim 28, wherein the connecting portion of the fixing member is fixed to the connecting portion of the support member by adhesion.

40. A mounting structure for mounting a solid state pickup element in an image reading-out apparatus as defined in claim 28, wherein the fixing member, the support member and the board are arranged in this order, and a window which is formed in a center of the support member is provided in the support member so that a beam of light from the lens can be incident on the image pickup element therethrough.

41. A mounting structure for mounting a solid state pickup element in an image reading-out apparatus as defined in claim 40, wherein the board is removably attached to the support member.

42. A mounting structure for mounting a solid-state pickup element in an image reading-out apparatus as defined in claim 40, wherein the connecting portion of the support member is one of a hole portion or a projection portion, and the connecting portion of the fixing member is the other of the hole portion or projection portion, wherein a gap portion formed by fitting the projection portion into the hole portion is filled with adhesive.

43. A mounting structure for mounting a solid state pickup, element in an image reading-out apparatus as defined in claim 42, wherein a hole is formed on the board in the same position where the connecting portion is located, and an amount of the adhesion to fix the fixing member and the support member in the connecting portion by means of adhesion is not in excess of a volume of the gap portion that is formed between the projection portion and the hole portion.

44. A mounting structure for mounting a solid-state pickup element in an image reading-out apparatus as defined in claim 42, wherein the projection portion is connected with the hole portion by melting the projection portion, a hole is formed on the board in the same position where the connecting portion is located, and an amount of adhesion to fix the fixing member and the support member in the connecting portion by means of adhesion is not in excess of a volume of the gap portion that is formed between the projection portion and the hole portion.

45. A mounting structure for mounting a solid state pickup element in an image reading-out apparatus as defined in claim 44, wherein the board is removably attached to the support member.

* * * * *